United States Patent
Nakazawa et al.

(10) Patent No.: US 7,226,157 B2
(45) Date of Patent: Jun. 5, 2007

(54) INK-JET RECORDING PROCESS

(75) Inventors: Koichiro Nakazawa, Tokyo (JP);
Takuei Ishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 286 days.

(21) Appl. No.: 10/765,037

(22) Filed: Jan. 28, 2004

(65) Prior Publication Data

US 2004/0246320 A1     Dec. 9, 2004

(30) Foreign Application Priority Data

Jan. 30, 2003 (JP) .............................. 2003-022648

(51) Int. Cl.
*B41J 2/01* (2006.01)
(52) U.S. Cl. .................. 347/100; 106/31.6; 106/31.13
(58) Field of Classification Search ................ 347/100; 106/31.6, 31.13
See application file for complete search history.

(56) References Cited

U.S. PATENT DOCUMENTS

| | | | |
|---|---|---|---|
| 4,313,124 A | 1/1982 | Hara | |
| 4,345,262 A | 8/1982 | Shirato et al. | |
| 4,459,600 A | 7/1984 | Sato et al. | |
| 4,463,359 A | 7/1984 | Ayata et al. | |
| 4,558,333 A | 12/1985 | Sugitani et al. | |
| 4,723,129 A | 2/1988 | Endo et al. | |
| 4,740,796 A | 4/1988 | Endo et al. | |
| 5,218,376 A | 6/1993 | Asai | |
| 5,754,194 A | 5/1998 | Endo et al. | |
| 6,084,619 A * | 7/2000 | Takemoto et al. | ............ 347/96 |

(Continued)

FOREIGN PATENT DOCUMENTS

EP    0 534 634    3/1993

(Continued)

*Primary Examiner*—Manish S. Shah
*Assistant Examiner*—L E Martin
(74) *Attorney, Agent, or Firm*—Fitzpatrick, Cella, Harper & Scinto

(57) ABSTRACT

Disclosed herein is an ink-jet recording process for conducting recording by ejecting a pigment ink and a reaction liquid containing a polyvalent metal salt from a recording section, in which a plurality of nozzles for ejecting the pigment ink and the reaction liquid are arranged, to a recording medium while relatively scanning the recording section to the recording medium, comprising the steps of ejecting the pigment ink having a surface tension lower than that of the reaction liquid to the reaction liquid ejected on the surface of the recording medium; and forming a filmy aggregate by gathering of agglomerates at an interface where the reaction liquid has come into contact with the pigment ink, wherein conditions for ejecting the reaction liquid to a prescribed area on the recording medium when at least the print duty of the ink in the prescribed area is 100% satisfy the relationship of $$55 \times \frac{0.85 \times 10^6 \times Vd(pl)^{-0.61}}{Rx(dpi)Ry(dpi)} \le duty(\%) \le 125 \times \frac{0.85 \times 10^6 \times Vd(pl)^{-0.61}}{Rx(dpi)Ry(dpi)}$$

wherein $Vd(pl)$ is an ejection volume per dot of the reaction liquid, $Rx(dpi)$ is a print resolution in the direction of the relative scanning, $Ry(dpi)$ is a print resolution in the arrangement direction of the nozzles, and $duty(\%)$ is a print duty of the reaction liquid.

10 Claims, 13 Drawing Sheets

U.S. PATENT DOCUMENTS 6,086,197 A * 7/2000 Kubota et al. ................ 347/96
6,494,569 B2 * 12/2002 Koitabashi et al. ........... 347/98
2002/0041310 A1 * 4/2002 Kaneko et al. ............... 347/65

FOREIGN PATENT DOCUMENTS

| JP | 55-65269 | 5/1980 |
|----|----------|--------|
| JP | 56-89595 | 7/1981 |
| JP | 59-123670 | 7/1984 |
| JP | 59-138461 | 8/1984 |
| JP | 61-59911 | 12/1986 |
| JP | 61-59912 | 12/1986 |
| JP | 61-59914 | 12/1986 |
| JP | 64-9279 | 1/1989 |
| JP | 64-63185 | 3/1989 |
| JP | 5-202328 | 8/1993 |
| JP | 9-207424 | 8/1997 |
| JP | 2783647 | 5/1998 |
| WO | WO 98/30398 | 7/1998 |

* cited by examiner

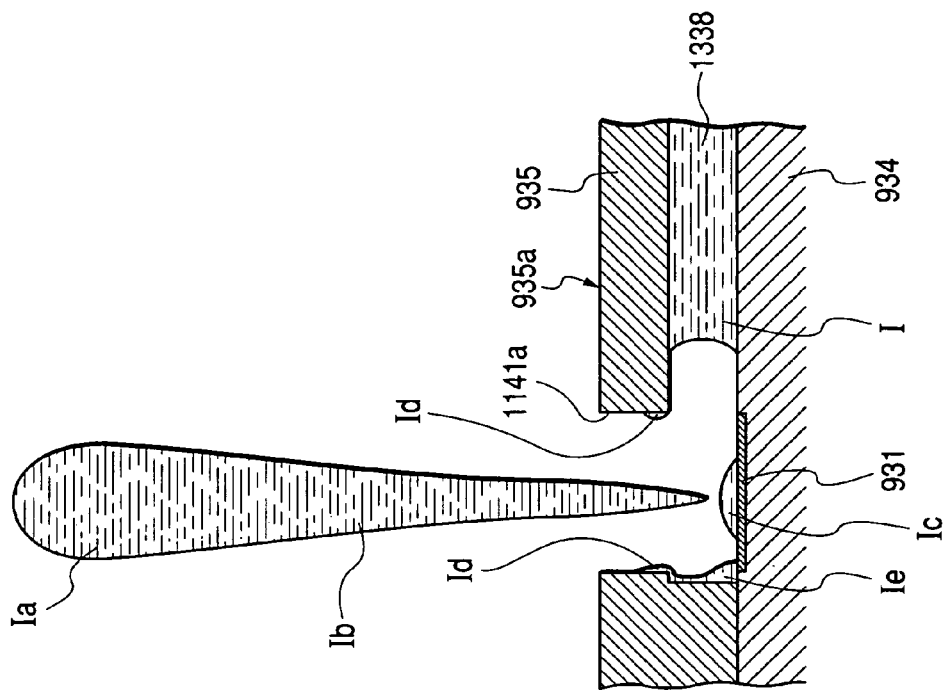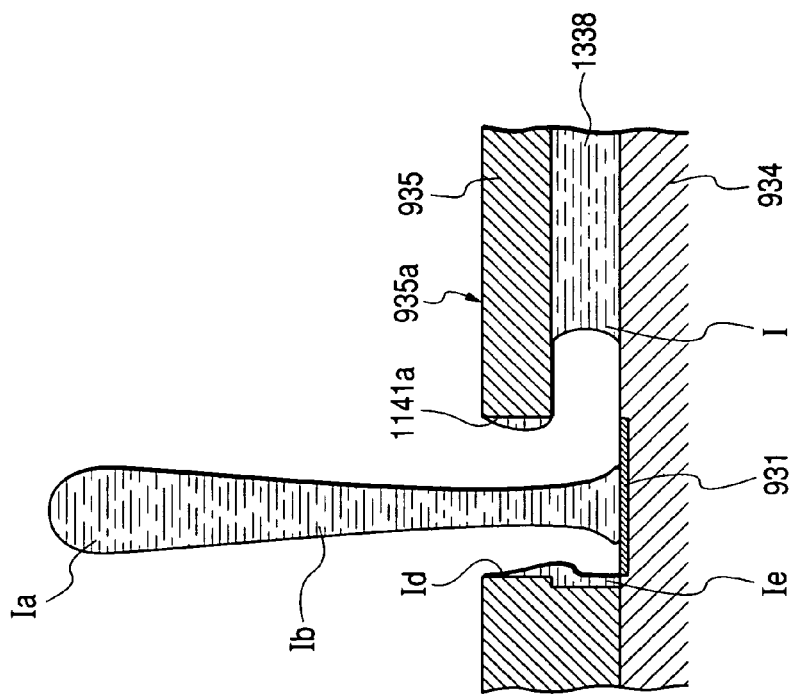

INK-JET RECORDING PROCESS

BACKGROUND OF THE INVENTION

1. Field of the Invention

The present invention relates to an ink-jet recording process, and particularly to an ink-jet recording process that can provide a high-quality color image high in fixing ability on plain paper.

2. Related Background Art

An ink-jet recording method is such a method that recording is conducted by ejecting minute droplets of an ink to apply the ink to a recording medium such as paper. According to the method (see, for example, Japanese Patent Publication Nos. 61-59911, 61-59912 and 61-59914), in which an electrothermal converter is used as an ejection energy-supplying means to apply thermal energy to ink so as to generate bubbles, thereby ejecting droplets of the ink, the formation of a high-density multi-orifice in a recording head can be realized with ease, and high-resolution and high-quality images can be recorded at high speed.

However, the conventional inks used in ink-jet recording generally comprise, as a principal component, water, and additionally include a water-soluble high boiling solvent such as glycol for the purpose of preventing drying and clogging at orifices, and the like. When such an ink is used to conduct recording on plain paper, there have hence arisen such problems as fixing ability cannot be sufficiently achieved, and image irregularity occurs, which appears to be attributed to the uneven distribution of a filler and/or a size on the surface of the paper. In particular, when color images are intended to be formed, plural inks of different colors are overlapped one after another before they are fixed to paper. Therefore, color bleeding and uneven color mixing have occurred at portions of boundaries between images of different colors (this phenomenon will hereinafter be referred to as "bleeding" simply), resulting in a failure to obtain satisfactory images.

As a means for improving the bleeding, the addition of a compound capable of enhancing penetrability, such as a surfactant, into the inks is disclosed (see, for example, Japanese Patent Application Laid-Open No. 55-65269). According to this method, the penetrability of the inks into recording paper is improved, and so bleeding can be prevented to some extent. However, such disadvantages that the image density and brightness of the resulting image are lowered, and the image shows through a recording medium to the back side thereof have been involved because coloring materials contained in the inks penetrate deeply into the recording medium. In addition, such inks have not been preferred because they are easy to be spread due to the improvement of wettability on the recording medium, resulting in reduction of resolution and occurrence of feathering.

In order to solve the above-described problems, there have been further proposed various methods, in which a liquid, which can make the quality of an image better, is applied to a recording medium prior to ejection of an ink. For example, a method, in which a solution of a polymer such as carboxymethyl cellulose, polyvinyl alcohol or polyvinyl acetate is ejected, and printing is then conducted, has been proposed (see, for example, Japanese Patent Application Laid-Open No. 56-89595). However, according to this method, it is feared that a problem that fixing ability is lowered due to poor drying ability of the solution itself will arise though anti-bleeding property is improved. In order to solve this problem, there have been disclosed, for example, a method, in which a liquid comprising an organic compound having two or more cationic groups per molecule is applied to a recording medium, and recording is then conducted with an ink comprising an anionic dye (see, for example, Japanese Patent Application Laid-Open No. 63-29971), a method, in which an acidic liquid containing succinic acid or the like is applied to a recording medium, and recording is then conducted with an ink comprising an anionic dye (see, for example, Japanese Patent Application Laid-Open No. 64-9279) and besides a method, in which a liquid, which insolubilizes dyes, is applied to a recording medium prior to recording (see, for example, Japanese Patent Application Laid-Open No. 64-63185).

According to all these methods, bleeding is prevented to some extent. In these methods, however, a color ink is applied to a recording medium at a stage after the reaction liquid penetrates into the recording medium and is present within the recording medium, and no reaction liquid becomes present on the surface of the recording medium, so that almost all the reaction takes place in the recording medium. Therefore, a problem that the coloring property of the resulting image is not improved, and a problem of the show through that the coloring material is shown through from the back side of the recording medium have arisen. As described above, when the color ink is reacted with the reaction liquid at the time the reaction liquid is present on the recording medium, the fixing ability of the resulting image is deteriorated. When the reaction liquid is reacted with the color ink at the time the reaction liquid is present in the recording medium on the other hand, it is feared that a problem that coloring property is deteriorated will arise.

To prevent bleeding by utilizing a reaction of a polyvalent metal ion with a carboxyl group has also been proposed (see, for example, Japanese Patent Application Laid-Open No. 5-202328). Even in this case, a liquid containing the polyvalent metal ion is reacted with a color ink after a recording medium is impregnated with the liquid, so that bleeding is prevented to some extent. However, problems of deterioration of coloring property and the show through are feared when the penetrability of the color ink into the recording medium is high. When the penetrability is low to the contrary, it is feared that a problem that fixing requires a long time may arise. In addition, a method, in which anti-bleeding property is improved by a reaction among a pigment, a resin emulsion and a polyvalent metal salt, has also been proposed (see, for example, Japanese Patent Application Laid-Open No. 9-207424). The fundamental concept of this method is almost the same as Japanese Patent Application Laid-Open No. 5-202328.

Further, an ink-jet recording method, by which an optimized image is obtained by defining an amount of a reaction liquid applied in terms of its weight ratio to an amount of a color ink applied, has been proposed (see, for example, International Publication No. 98/30398, pamphlet). In this method, it has been proposed to make a dot of the reaction liquid smaller than a dot of the color ink though conditions are substantially changed by surface tensions of the reaction liquid and color ink. According to this method, however, the amount of the reaction liquid applied must also be increased as the color becomes a secondary color or tertiary color. As a result, a larger amount of a solvent comes to be present in printed areas of the secondary color and tertiary color, so that fixing requires a longer time.

As described above, various proposals using the color ink and reaction liquid as a means for improving the anti-bleeding property have been made. In all events, the anti-bleeding property is improved to some extent, but the deterioration of coloring property and the show through occur when importance is attached to the fixing ability. On the other hand, the fixing ability is deteriorated when importance is attached to the coloring property and the show through. In other words, under the circumstances, any method that can satisfy the fixing ability and the coloring property and the show through at the same time while reducing the bleeding has not been proposed. Further, the proposal that the amount of the reaction liquid applied is defined is a proposal that its ratio to the amount of the color ink applied is specified, so that the proposal cannot be always be said to be optimum according to the recording method and conditions.

SUMMARY OF THE INVENTION

The present invention has been made with the foregoing circumstances in view and has as its object the provision of an ink-jet recording process that can solve the problem of the show through of a color ink in a recording medium without sacrificing both fixing ability and coloring property while solving the bleeding that is a great problem in printing on a recording medium such as plain paper by an ink-jet recording system.

The above object can be achieved by the present invention described below.

According to the present invention, there is thus provided an ink-jet recording process for conducting recording by ejecting a pigment ink and a reaction liquid containing a polyvalent metal salt from a recording section, in which a plurality of nozzles for ejecting the pigment ink and the reaction liquid are arranged, to a recording medium while relatively scanning the recording section to the recording medium, the process comprising the steps of:

ejecting the pigment ink having a surface tension lower than that of the reaction liquid to the reaction liquid ejected on the surface of the recording medium; and forming a filmy aggregate by gathering of agglomerates at an interface where the reaction liquid has come into contact with the pigment ink, wherein conditions for ejecting the reaction liquid in the ejection step satisfy the relationship of $$55 \times \frac{0.85 \times 10^6 \times Vd(pl)^{-0.61}}{Rx(dpi)Ry(dpi)} \leq duty(\%) \leq 125 \times \frac{0.85 \times 10^6 \times Vd(pl)^{-0.61}}{Rx(dpi)Ry(dpi)}$$

wherein $Vd(pl)$ is an ejection volume per dot of the reaction liquid, $Rx(dpi)$ is a print resolution in the direction of the relative scanning, $Ry(dpi)$ is a print resolution in the arrangement direction of the nozzles, and $duty(\%)$ is a print duty of the reaction liquid.

According to the present invention, there is also provided an ink-jet recording process for conducting recording by ejecting a pigment ink and a reaction liquid containing a polyvalent metal salt from a recording section, in which a plurality of nozzles for ejecting the pigment ink and the reaction liquid are arranged, to a recording medium while relatively scanning the recording section to the recording medium, the process comprising the steps of:

ejecting the pigment ink having a surface tension lower than that of the reaction liquid to the reaction liquid ejected on the surface of the recording medium; and forming a filmy aggregate by gathering of agglomerates at an interface where the reaction liquid has come into contact with the pigment ink, wherein conditions for ejecting the reaction liquid to a prescribed area on the recording medium when at least the print duty of the ink in the prescribed area is 100% satisfy the relationship of $$55 \times \frac{0.85 \times 10^6 \times Vd(pl)^{-0.61}}{Rx(dpi)Ry(dpi)} \leq duty(\%) \leq 125 \times \frac{0.85 \times 10^6 \times Vd(pl)^{-0.61}}{Rx(dpi)Ry(dpi)}$$

wherein $Vd(pl)$ is an ejection volume per dot of the reaction liquid, $Rx(dpi)$ is a print resolution in the direction of the relative scanning, $Ry(dpi)$ is a print resolution in the arrangement direction of the nozzles, and $duty(\%)$ is a print duty of the reaction liquid.

According to the present invention, there is further provided an ink-jet recording process for conducting recording on a recording medium by ejecting a pigment ink and a reaction liquid having a surface tension higher than that of the pigment ink and containing a polyvalent metal salt, which agglomerates the pigment ink, from a recording section, in which a plurality of nozzles for ejecting the pigment ink and the reaction liquid are arranged, to the recording medium while relatively scanning the recording section to the recording medium, the process comprising the steps of:

ejecting the reaction liquid to the recording medium; and ejecting the pigment ink to the recording medium in such a manner that the pigment ink is brought into contact with the recording liquid present in a liquid state on the surface of the recording medium, wherein conditions for ejecting the reaction liquid in the ejection step satisfy the relationship of $$55 \times \frac{0.85 \times 10^6 \times Vd(pl)^{-0.61}}{Rx(dpi)Ry(dpi)} \leq duty(\%) \leq 125 \times \frac{0.85 \times 10^6 \times Vd(pl)^{-0.61}}{Rx(dpi)Ry(dpi)}$$

wherein $Vd(pl)$ is an ejection volume per dot of the reaction liquid, $Rx(dpi)$ is a print resolution in the direction of the relative scanning, $Ry(dpi)$ is a print resolution in the arrangement direction of the nozzles, and $duty(\%)$ is a print duty of the reaction liquid.

According to the present invention, there is still further provided an ink-jet recording process for conducting recording on a recording medium by ejecting a pigment ink and a reaction liquid having a surface tension higher than that of the pigment ink and containing a polyvalent metal salt, which agglomerates the pigment ink, from a recording section, in which a plurality of nozzles for ejecting the pigment ink and the reaction liquid are arranged, to the recording medium while relatively scanning the recording section to the recording medium, the process comprising the steps of:

ejecting the reaction liquid to the recording medium; and ejecting the pigment ink to the recording medium in such a manner that the pigment ink is brought into contact with the recording liquid present in a liquid state on the surface of the recording medium, wherein conditions for ejecting the reaction liquid to a prescribed area on the recording medium when at least the print duty of the ink in the prescribed area is 100% satisfy the relationship of $$55 \times \frac{0.85 \times 10^6 \times Vd(pl)^{-0.61}}{Rx(dpi)Ry(dpi)} \leq duty(\%) \leq 125 \times \frac{0.85 \times 10^6 \times Vd(pl)^{-0.61}}{Rx(dpi)Ry(dpi)}$$

wherein Vd(pl) is an ejection volume per dot of the reaction liquid, Rx(dpi) is a print resolution in the direction of the relative scanning, Ry(dpi) is a print resolution in the arrangement direction of the nozzles, and duty(%) is a print duty of the reaction liquid.

According to the present invention, there is yet still further provided an ink-jet recording process for conducting recording by ejecting a reaction liquid containing a polyvalent metal salt and a surfactant to a recording medium from a recording section, in which a plurality of nozzles for ejecting the reaction liquid and a pigment ink containing a surfactant in a higher content than that of the reaction liquid are arranged, and subsequently ejecting the pigment ink while relatively scanning the recording section to the recording medium, the process comprising the steps of:

bringing the pigment ink into contact with an interface of the reaction liquid present on the surface of the recording medium; and forming a filmy aggregate by gathering of agglomerates at the interface where the reaction liquid has come into contact with the pigment ink, wherein conditions for ejecting the reaction liquid satisfy the relationship of $$55 \times \frac{0.85 \times 10^6 \times Vd(pl)^{-0.61}}{Rx(dpi)Ry(dpi)} \leq duty(\%) \leq 125 \times \frac{0.85 \times 10^6 \times Vd(pl)^{-0.61}}{Rx(dpi)Ry(dpi)}$$

wherein Vd(pl) is an ejection volume per dot of the reaction liquid, Rx(dpi) is a print resolution in the direction of the relative scanning, Ry(dpi) is a print resolution in the arrangement direction of the nozzles, and duty(%) is a print duty of the reaction liquid.

According to the present invention, there is yet still further provided an ink-jet recording process for conducting recording by ejecting a reaction liquid containing a polyvalent metal salt and a surfactant to a recording medium from a recording section, in which a plurality of nozzles for ejecting the reaction liquid and a pigment ink containing a surfactant in a higher content than that of the reaction liquid are arranged, and subsequently ejecting the pigment ink while relatively scanning the recording section to the recording medium, the process comprising the steps of:

bringing the pigment ink into contact with an interface of the reaction liquid present on the surface of the recording medium; and forming a filmy aggregate by gathering of agglomerates at the interface where the reaction liquid has come into contact with the pigment ink, wherein conditions for ejecting the reaction liquid to a prescribed area on the recording medium when at least the print duty of the ink in the prescribed area is 100% satisfy the relationship of $$55 \times \frac{0.85 \times 10^6 \times Vd(pl)^{-0.61}}{Rx(dpi)Ry(dpi)} \leq duty(\%) \leq 125 \times \frac{0.85 \times 10^6 \times Vd(pl)^{-0.61}}{Rx(dpi)Ry(dpi)}$$

wherein Vd(pl) is an ejection volume per dot of the reaction liquid, Rx(dpi) is a print resolution in the direction of the relative scanning, Ry(dpi) is a print resolution in the arrangement direction of the nozzles, and duty(%) is a print duty of the reaction liquid.

According to the present invention, there is yet still further provided an ink-jet recording process for conducting recording by ejecting a reaction liquid containing a polyvalent metal salt and a pigment ink having a surface tension lower than that of the reaction liquid to a recording medium in that order from a recording section, in which a plurality of nozzles for ejecting the reaction liquid and the pigment ink are arranged, while relatively scanning the recording section to the recording medium, the process comprising the steps of:

bringing the reaction liquid into contact with the pigment ink on the surface of the recording medium;

forming a filmy aggregate by gathering of agglomerates at an interface where the reaction liquid has come into contact with the pigment ink; and accelerating penetration of the reaction liquid with respect to the recording medium, wherein conditions for ejecting the reaction liquid satisfy the relationship of $$55 \times \frac{0.85 \times 10^6 \times Vd(pl)^{-0.61}}{Rx(dpi)Ry(dpi)} \leq duty(\%) \leq 125 \times \frac{0.85 \times 10^6 \times Vd(pl)^{-0.61}}{Rx(dpi)Ry(dpi)}$$

wherein Vd(pl) is an ejection volume per dot of the reaction liquid, Rx(dpi) is a print resolution in the direction of the relative scanning, Ry(dpi) is a print resolution in the arrangement direction of the nozzles, and duty(%) is a print duty of the reaction liquid.

According to the present invention, there is yet still further provided an ink-jet recording process for conducting recording by ejecting a reaction liquid containing a polyvalent metal salt and a pigment ink having a surface tension lower than that of the reaction liquid to a recording medium in that order from a recording section, in which a plurality of nozzles for ejecting the reaction liquid and the pigment ink are arranged, while relatively scanning the recording section to the recording medium, the process comprising the steps of:

bringing the reaction liquid into contact with the pigment ink on the surface of the recording medium;

forming a filmy aggregate by gathering of agglomerates at an interface where the reaction liquid has come into contact with the pigment ink; and accelerating penetration of the reaction liquid with respect to the recording medium, wherein conditions for ejecting the reaction liquid to a prescribed area on the recording medium when at least the print duty of the ink in the prescribed area is 100% satisfy the relationship of $$55 \times \frac{0.85 \times 10^6 \times Vd(pl)^{-0.61}}{Rx(dpi)Ry(dpi)} \leq duty(\%) \leq 125 \times \frac{0.85 \times 10^6 \times Vd(pl)^{-0.61}}{Rx(dpi)Ry(dpi)}$$

wherein Vd(pl) is an ejection volume per dot of the reaction liquid, Rx(dpi) is a print resolution in the direction of the relative scanning, Ry(dpi) is a print resolution in the arrangement direction of the nozzles, and duty(%) is a print duty of the reaction liquid.

BRIEF DESCRIPTION OF THE DRAWING

FIG. 10 is a schematic cross-sectional view for explaining a liquid-ejecting operation of the liquid-ejecting head with time corresponding to the section taken along line 4—4 in FIG. 3.

FIG. 11 is a schematic cross-sectional view for explaining a liquid-ejecting operation of the liquid-ejecting head with time corresponding to the section taken along line 4—4 in FIG. 3.

DETAILED DESCRIPTION OF THE PREFERRED EMBODIMENTS

The present invention will hereinafter be described in more detail by the preferred embodiments of the invention. An ink-jet recording process that is a prerequisite of the present invention will be first described with reference to FIGS. 12A to 12F, FIGS. 13A to 13D, FIGS. 14A and 14B, and FIG. 15.

Figure 12A:
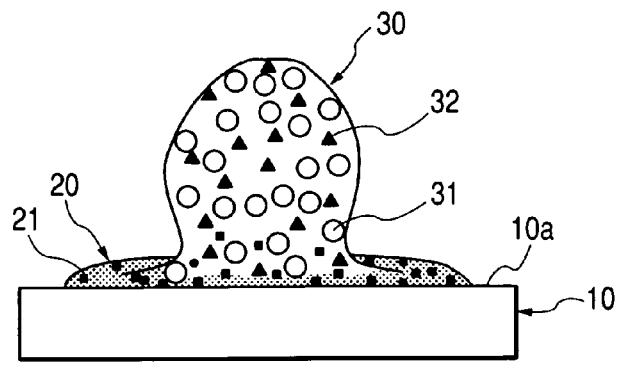
FIGS. 12A, 12B, 12C, 12D, 12E and 12F typically illustrate an ink-jet recording process that is a prerequisite of the present invention.

FIGS. 12A to 12F typically illustrate the concept of a fundamental ink-jet recording process that is a prerequisite of the present invention. FIG. 12A illustrates a step of bringing a reaction liquid 20 into contact with a pigment ink 30 on the surface of a recording medium 10 and shows the instant when the pigment ink 30 came into contact with the reaction liquid 20 by applying the pigment ink 30 to the recording medium 10, on which the reaction liquid 20 had been applied in advance. Incidentally, in this embodiment, the penetrability of the pigment ink is made higher than that of the reaction liquid from the viewpoints of bringing the reaction liquid into contact with the pigment ink in a liquid state and quickly fixing a filmy aggregate. More specifically, the surface tension of the pigment ink is made lower than that of the reaction liquid. This relation of the surface tension can be controlled by, for example, varying the contents of surfactants in the reaction liquid and the pigment ink.

As for a method of applying the reaction liquid 20, application by an ink-jet system that is a well-known technique may be preferably used. In order to bring the reaction liquid 20 into contact with the pigment ink 30 on the surface of the recording medium 10, the pigment ink must be applied before the reaction liquid 20 applied to the recording medium 10 completely penetrates into the recording medium 10. In other words, the pigment ink is brought into contact with the reaction liquid while the reaction liquid is present in a liquid state on the surface of the recording medium. In order to realize this, it is preferable to use a reaction liquid 20 having a low penetrability. When the reaction liquid 20 has a low penetrability with respect to the recording medium 10, preferable recording conditions are easily set because it can take a certain time until the pigment ink 30 is applied.

Figure 12B:
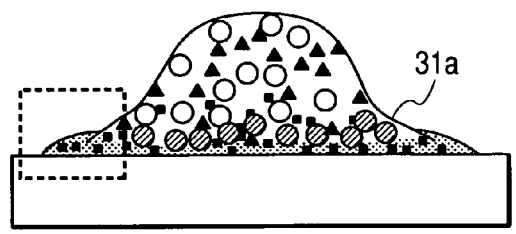
Figure 12C:
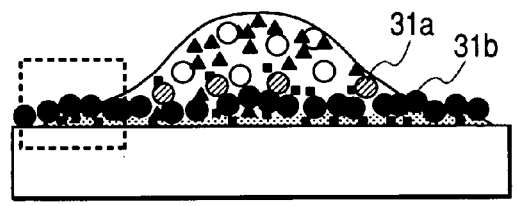
Figure 12D:
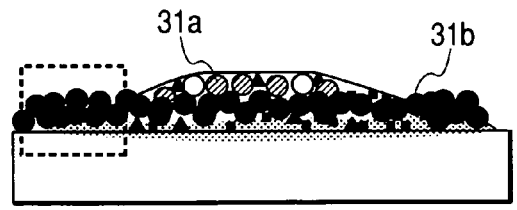

FIGS. 12B, 12C and 12D illustrate a step of forming a filmy aggregate 31c at an interface where the reaction liquid has come into contact with the pigment ink. This step has the process that the filmy aggregate 31c is formed by gathering agglomerates 31b of a pigment immediately after the preceding step.

In order to form the agglomerate 31b that comprises the filmy aggregate 31c, it is necessary to cause aggregation of the pigment by the reaction of components in the pigment ink 30. The most suitable method for causing such aggregation is incorporation of a polyvalent metal ion, which causes the aggregation, into the reaction liquid. This method can be used with a method of utilizing an acidic precipitation in which the pH of the reaction liquid is lowered or a method of adding a cationic organic substance to cause aggregation.

The polyvalent metal ion 21 contained in the reaction liquid causes reaction by collision with carboxylic acid ions, sulfonic acid ions, phosphoric acid ions and the like in the pigment ink 30, which decreases dispersiveness of the pigment to cause aggregation of the pigment. The aggregation of the pigment takes place more easily with increasing the probability of the collision. Thus it is preferable that the polyvalent metal ion 21 to be contained in the reaction liquid 20 is added in such an amount that the concentration of the polyvalent metal ion 21 is higher than the total charge concentration of ions of the opposite polarity, which react with the polyvalent metal ion 21 in the pigment ink 30.

Here the total charge concentration is defined as the number of the polyvalent metal ions per unit mass for the reaction liquid and as the number of the ions of the opposite polarity such as carboxylic acid ions, sulfonic acid ions, phosphoric acid ions and the like per unit mass for the pigment ink.

When the reaction liquid is brought into contact with the pigment ink while the reaction liquid is present in a liquid state on the top surface of a recording medium as shown in FIG. 12B, the instant bonding of the polyvalent metal ion with the carboxylic acid ions, sulfonic acid ions, phosphoric acid ions and the like in the pigment ink 30 takes place to produce a pigment particle 31a obtained by eliminating the electric repulsive force of a pigment particle 31 in a dispersed condition. Then the agglomerate 31b composed of the pigment particle 31a is rapidly formed due to the van der Waals attracting force between the pigment particles 31a, and finally the filmy aggregate 31c is formed by gathering of the agglomerate 31b.

Figure 13A:
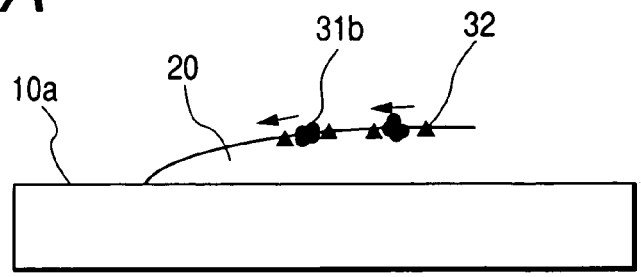
FIGS. 13A, 13B, 13C and 13D illustrate a state that a filmy aggregate 31c is formed by gathering agglomerates 31b.
Figure 13B:
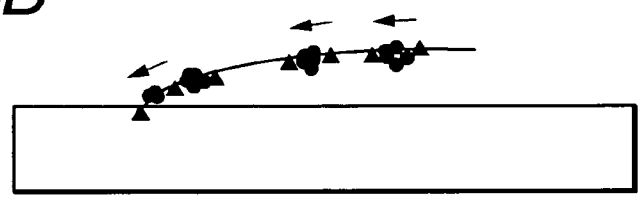
Figure 13C:
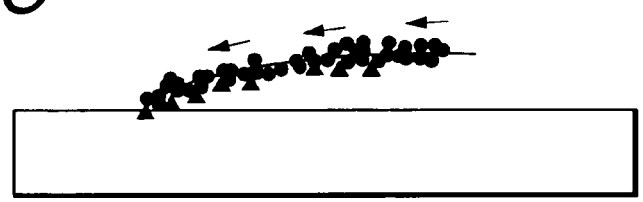
Figure 13D:
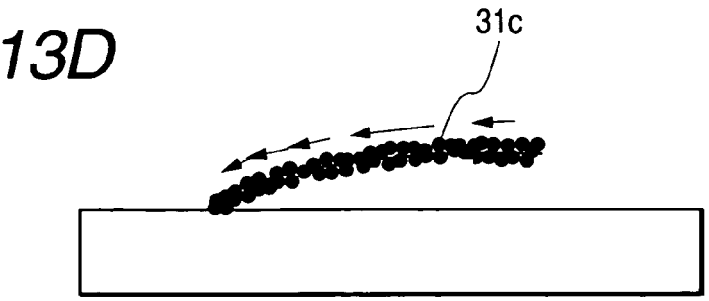

The mechanism that the agglomerates 31b gather to form the filmy aggregate 31c is described in detail with reference to FIGS. 13A to 13D. FIGS. 13A to 13D are enlarged views of a site surrounded by a broken line in FIGS. 12B to 12D. As illustrated in FIG. 13A, an agglomerate 31b formed immediately after the pigment ink 30 comes into contact with the reaction liquid 20 migrates on the surface of the reaction liquid 20 together with a surfactant 32. The migration of the agglomerate 31b and surfactant 32 on the surface of the reaction liquid 20 is owing to the fact that the surfactant 32 in the pigment ink 30 is oriented and migrates on the surface of the reaction liquid 20 when it comes into contact with the reaction liquid 20 by increasing the content of the surfactant 32 in the pigment ink 30, and that the agglomerate 31b also migrates together with the flow of the surfactant. As illustrated in FIG. 13B, the agglomerate 31b then stops at a boundary between the reaction liquid 20 and the recording medium 10, and following agglomerates 31b come to migrate. As illustrated in FIG. 13C, successively formed agglomerates 31b are oriented to the surface of the reaction liquid 20. Lastly, as illustrated in FIG. 13D, the density of the agglomerates 31b is raised to form the filmy aggregate 31c by gathering of the agglomerates 31b on the surface of the reaction liquid 20.

A feature of the filmy aggregate 31c formed in such a manner resides in that it is not a film through which nothing is passed because the pigment particles are mutually aggregated, but at least the surfactant 32 and a solvent in the pigment ink 30 and a polyvalent metal ion 21 and a solvent in the reaction liquid 20, which are smaller than the pigment particles, can be passed through between these pigment particles.

Figure 12E:
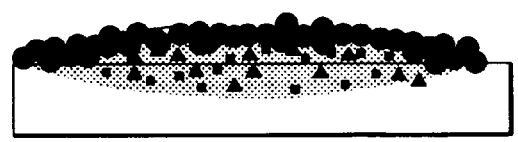
Figure 12F:
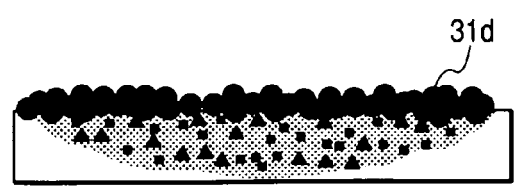

Description is then given on FIGS. 12E and 12F. FIGS. 12E and 12F illustrate in time series a step of conducting a process of accelerating penetration of the reaction liquid 20 into the recording medium 10 and a process of fixing the filmy aggregate 31c to the surface of the recording medium 10 at almost the same time.

A penetration accelerator typified by the surfactant 32 contained in the pigment ink 30 and the solvent diffuse into the reaction liquid 20, and the penetrability of the reaction liquid is improved with this diffusion, and so the solvent component in the reaction liquid 20 and the solvent component in the pigment ink 30 rapidly penetrate into the recording medium 10.

Figure 14A:
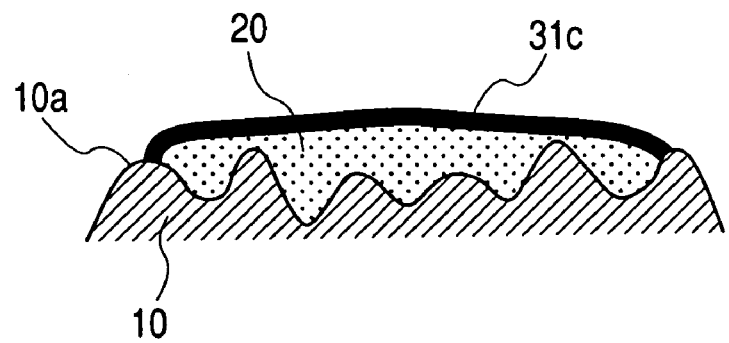
FIGS. 14A and 14B illustrate a state that the filmy aggregate 31c is fixed to the surface of a recording medium to form an aggregate film 31d.
Figure 14B:
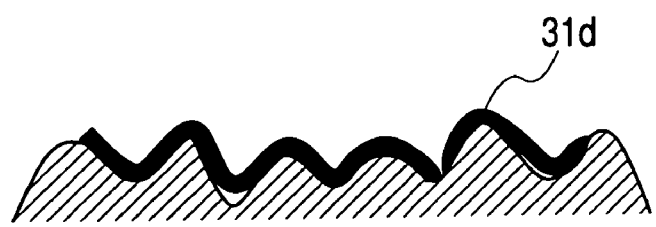

A state that this process is in progress is illustrated in FIG. 12E. As illustrated in FIG. 12F finally, the filmy aggregate 31c is fixed to the surface of the recording medium 10 (for example, plain paper formed by plural fibers) so as to cover the surface, thereby forming an aggregate film 31d. In fact, the filmy aggregate 31c is formed as illustrated in FIG. 14A owing to the inequalities by irregularities of fibers on the surface of the plain paper, and the solvent component in the reaction liquid 20 and the solvent component in the pigment ink 30 then rapidly penetrate into the recording medium 10 so as to cover the recording medium 10 with the filmy aggregate 31c along the inequalities formed of the irregularities of the fibers as illustrated in FIG. 14B, whereby the filmy aggregate 31c is finally fixed as the aggregate film 31d. At this time, as a feature of the aggregate film 31d, it may be provided as a bridged aggregate film 31d so as to cover straddling valleys (recessed portions) between fibers. Alternatively, the aggregate film 31d may be cracked in some cases.

Both fixing ability and coloring property can be improved by this step. In other words, the mixed liquid component of the reaction liquid 20 and pigment ink 30 rapidly penetrates into the recording medium 10, whereby the filmy aggregate 31c can be rapidly fixed to the surface of the recording medium to achieve rapid fixing. In addition, high coloring ability can be achieved by the aggregate film 31d formed of the filmy aggregate fixed so as to cover the surface of the recording medium.

Figure 15:
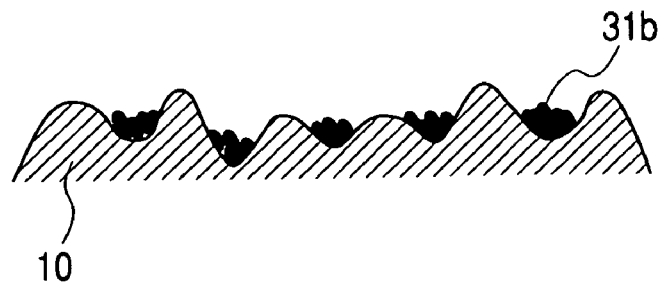
FIG. 15 illustrates a state of the surface of a recording medium, on which no aggregate film 31d is formed.

On the other hand, no finding that the filmy aggregate 31c is formed by gathering of the agglomerates 31b at the contact boundary between the pigment ink and reaction liquid is recognized in the above-described prior art documents, and no filmy aggregate 31c can be formed by these prior arts. According to these prior arts, only agglomerates 31c are finally formed on the surface of the recording medium as illustrated in FIG. 15 because no filmy aggregate 31c is formed, so that such high coloring ability as in the case where the aggregate film is formed cannot be achieved.

In the ink-jet recording process that becomes prerequisite conditions as described above, cases where each of the conditions is omitted will hereinafter be described. The case where the reaction liquid is brought into contact with the ink at another portion than the surface of the recording medium 10 will be first described. When the reaction liquid 20 being impregnated into the recording medium 10 is brought into contact with the pigment ink 30, almost all the reaction takes place in the recording medium 10. Therefore, the distribution of the pigment particles becomes higher in the interior of the recording medium 10 than the surface thereof, whereby no high coloring ability can be achieved. Since no formation of the agglomerates 31b at the interface of the reaction liquid occurs, any filmy aggregate 31c that is an aggregate of the agglomerates 31b should not be formed. High coloring ability cannot be also achieved for this reason. In addition, a problem of the show through that the coloring material shows through from the backside of the recording medium is also caused.

When the penetrability of the reaction liquid 20 with respect to the recording medium 10 is high, the time until the color pigment ink is applied must be shortened. This means that the condition setting range of the recording conditions is limited. For example, in a recording method, in which a black pigment ink and color pigment inks are successively applied after the reaction liquid 20 is applied, all the black pigment ink and plural color pigment inks must be applied in a short period of time, so that such disadvantages that a recording apparatus must be driven at high speed are involved. Since the penetrability of the reaction liquid 20 varies according to the kind of the recording medium 10 used, there is a possibility that images depending on recording media 10 may be formed on different recording media 10, so that fears are entertained that no stable recorded article would be obtained. In addition, due to different reaction velocities of the black pigment ink and color pigment inks, the reaction may be possibly completed after penetration into the recording medium, not on the surface of the recording medium 10, even when the black pigment ink and color pigment inks are brought into contact on the surface of the recording medium 10. In this case, there is also a possibility that any stable recorded article may not be obtained.

The case where no filmy aggregate 31c is formed will now be described. Even when pigment particles agglomerate by losing electrical repulsion, no filmy aggregate may be formed, but fine agglomerates may be formed by gathering of some pigment particles in some cases. According to the investigation by the present inventors, the size of these agglomerates 31b is often 10 μm or smaller. It has been found that almost all the fine agglomerates formed in such a manner flow into between fibers of the recording medium 10 together with the liquid components of the reaction liquid 20 and color pigment inks with the penetration of the liquid components. There is thus a fear that a recorded article excellent in fixing ability, but low in coloring property may be provided.

With respect to a change in the penetrability of the reaction liquid 10 by diffusion of the penetration accelerator in the pigment ink into the reaction liquid 10, the penetrability of the reaction liquid does not change when the penetration accelerator does not diffuse into the reaction liquid 10, and the liquid component in the pigment ink 30 is retained on the filmy aggregate 31c. Therefore, a printing section dries the solvent over a long period of time, so that a problem that the fixing ability is deteriorated is caused. When no penetration accelerator is contained in the pigment ink, the penetrability of the reaction liquid 20 is likewise not changed, so that the printing section comes to keep the liquid over a long period of time, thereby causing the problem that the fixing ability is deteriorated.

A mode of applying a reaction liquid, which characterizes the present invention, will hereinafter be described. The present inventors have extensively investigated a method for solving various problems of coloring property, fixing ability, bleeding and show through of color as to printed articles at the same time. As a result, it has been found that the above various problems can be solved by controlling the mode of applying the reaction liquid to a recording medium so as to satisfy the following expression 1

$$55 \times \frac{0.85 \times 10^6 \times Vd(pl)^{-0.61}}{Rx(dpi)Ry(dpi)} \leq duty(\%) \leq 125 \times \frac{0.85 \times 10^6 \times Vd(pl)^{-0.61}}{Rx(dpi)Ry(dpi)}$$

In the expression 1, Vd(pl) is an ejection volume per dot of the reaction liquid.

Rx(dpi) is a print (or recording) resolution in a recording direction. The recording direction is a direction of relative scanning between a recording head and the recording medium accompanied by an ejecting operation of the reaction liquid. Incidentally, "dpi" is an abbreviation of "dots/inch" and a unit indicating the number of dots per inch.

Ry(dpi) is a print (or recording) resolution in an arrangement direction of the nozzles in the recording head. The arrangement direction of the nozzles is substantially perpendicular to the recording direction by the relative scanning.

Duty(%) denotes a print (or recording) duty of the reaction liquid. The term "print duty" (or "recording duty") as used herein means a proportion of actually ejected dots to the number of pixels defined by the print resolutions (Rx, Ry). For example, when the print resolutions (Rx, Ry) are 1200 dpi and 1200 dpi, respectively, a unit area of $\frac{1}{1200}$ inch×$\frac{1}{1200}$ inch can be defined as a pixel. The number of pixels in a prescribed area on the recording medium is also defined like this. The print duty of the reaction liquid in the prescribed area is calculated by [(the number M of dots actually ejected to the prescribed area)÷(the number N of pixels in the prescribed area)×100]. Incidentally, the prescribed area may be an area corresponding to the whole area on the recording medium, one band area corresponding to one scanning of the recording head or a divided area obtained by further dividing this one band area.

As described above, the print duty means that M/N dots on the average are shot on a pixel defined by the print resolutions (Rx, Ry). For example, a print duty of 100% means that one dot on the average is shot on a pixel, and a print duty of 25% means that 0.25 dots on the average are shot on a pixel.

The expression 1 is an expression derived from the investigation by the present inventors and obtained by power-approximating the relationship between the ejection volume Vd(pl) and the print duty from plural data values satisfying the object of this proposal based on the results of Examples and Comparative Examples shown in Table 1 and correcting this approximation so as to be inversely proportional to the print resolutions (Rx, Ry).

Figure 16:
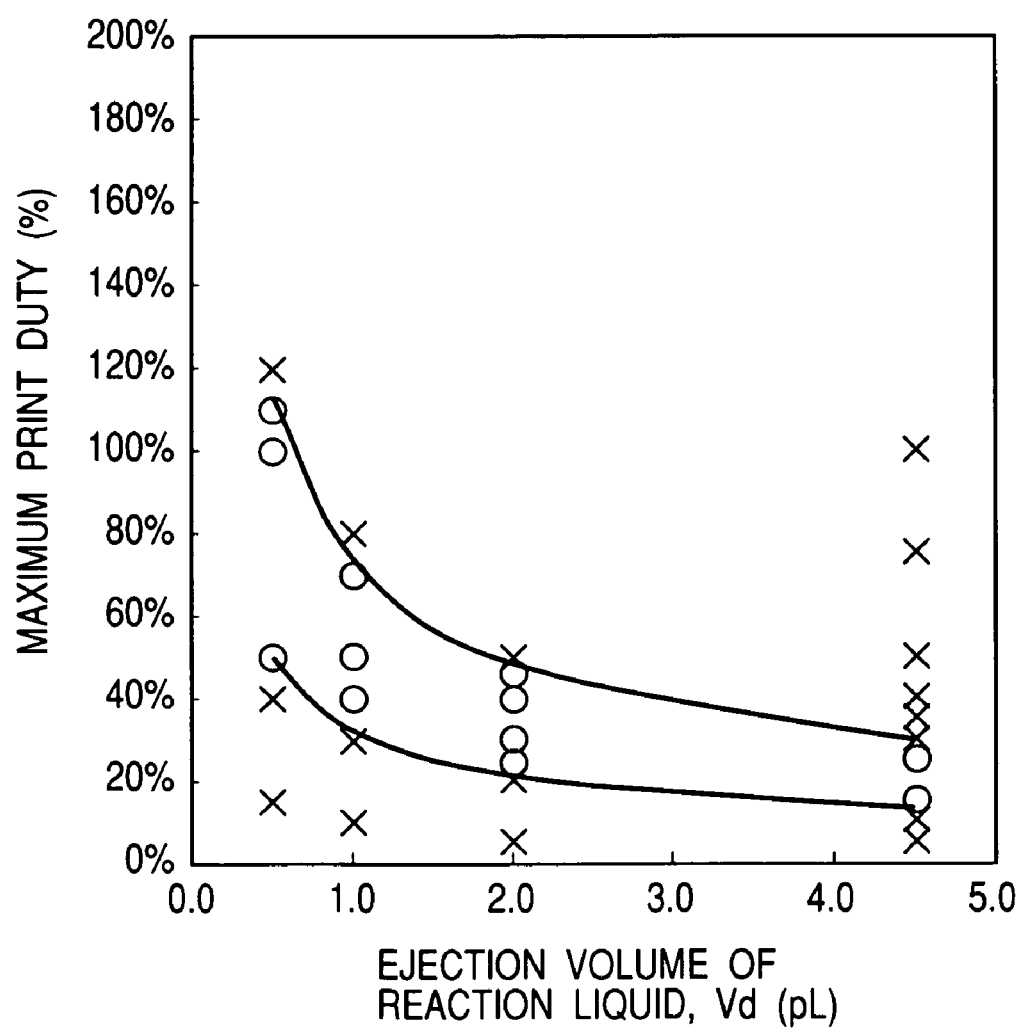
FIG. 16 diagrammatically illustrates the relationship between an ejection volume Vd(pl) and a print duty of a reaction liquid when print resolutions Rx and Ry are 1200 and 1200, respectively.
Figure 17:
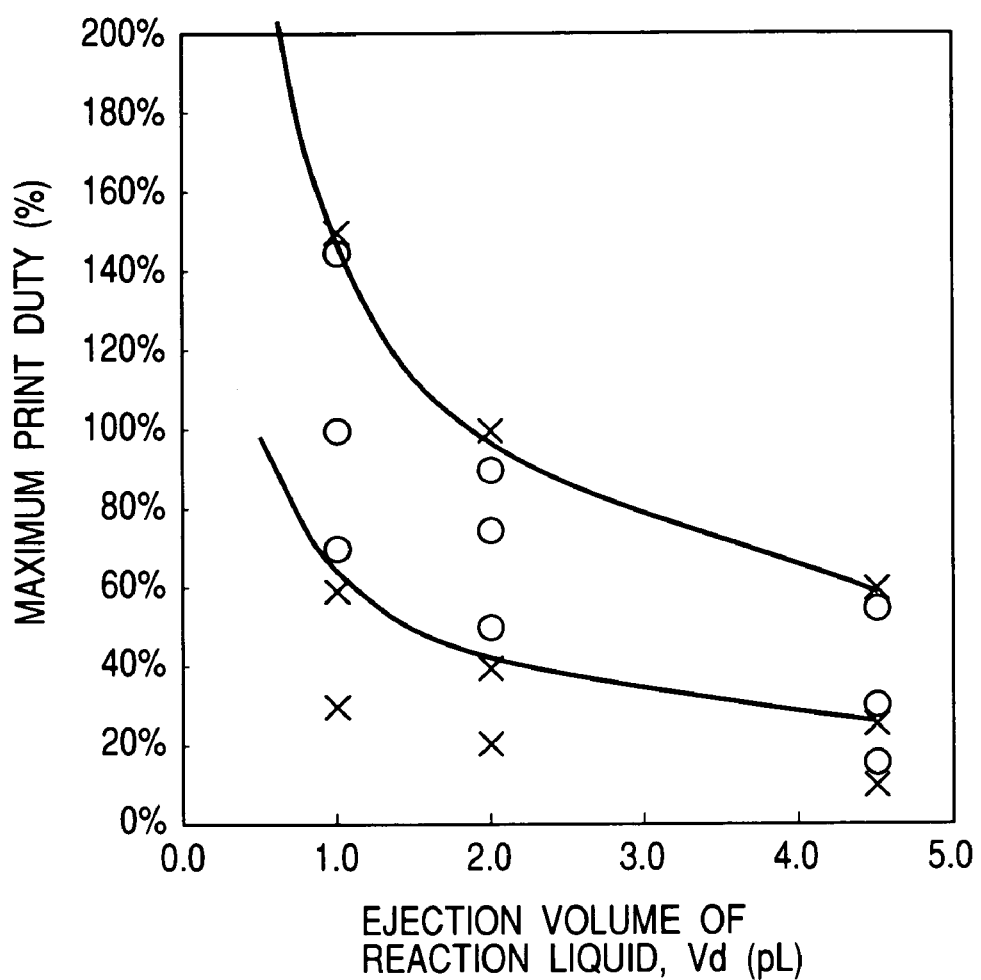
FIG. 17 diagrammatically illustrates the relationship between an ejection volume Vd(pl) and a print duty of the reaction liquid when print resolutions Rx and Ry are 600 and 1200, respectively.
Figure 18:
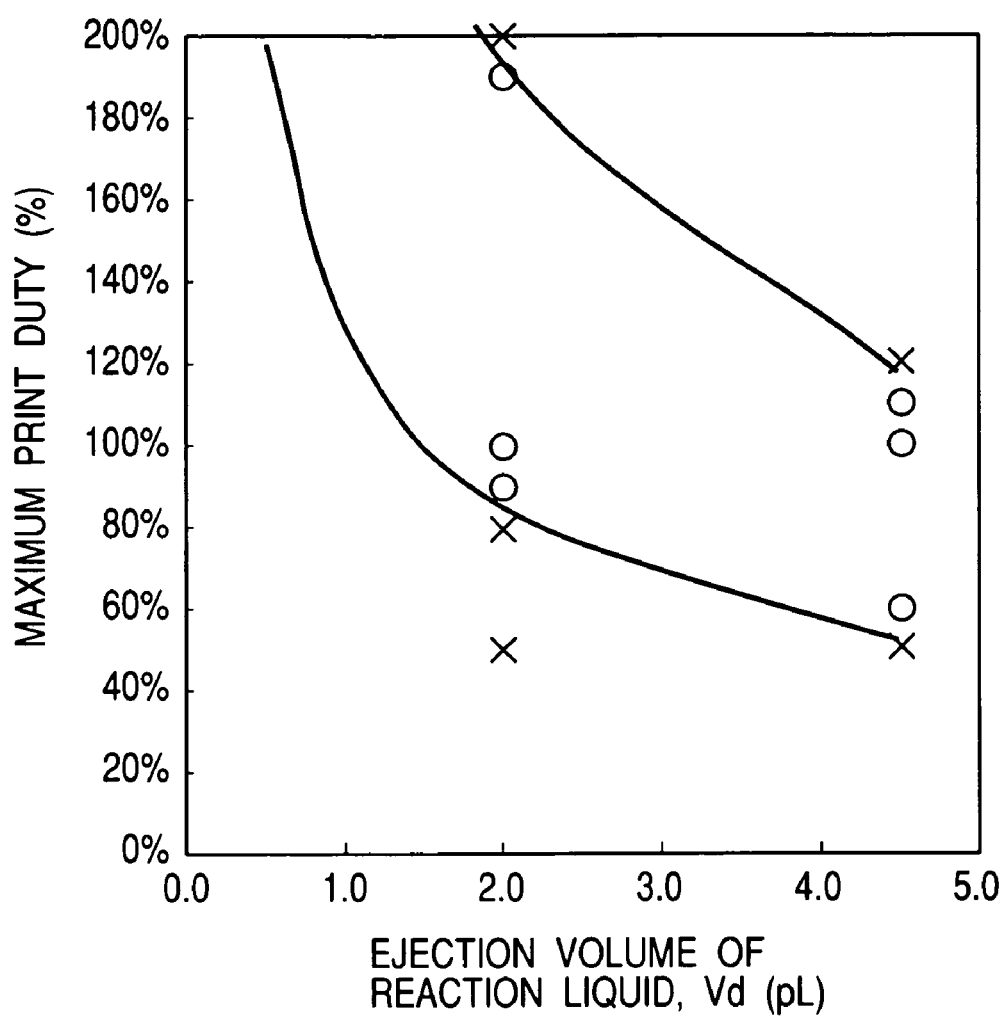
FIG. 18 diagrammatically illustrates the relationship between an ejection volume Vd(pl) and a print duty of the reaction liquid when print resolutions Rx and Ry are 600 and 600, respectively.

FIGS. 16 to 18 are graphs obtained by plotting ejection conditions (ejection volume Vd, print duty) of reaction liquids shown in Examples and Comparative Examples of Table 1 at every print resolution (Rx, Ry). FIG. 16 diagrammatically illustrates the relationship between an ejection volume Vd(pl) and a print duty of a reaction liquid when print resolutions Rx and Ry are 1200 and 1200, respectively. FIG. 17 diagrammatically illustrates the relationship between an ejection volume Vd(pl) and a print duty of the reaction liquid when print resolutions Rx and Ry are 600 and 1200, respectively.

FIG. 18 diagrammatically illustrates the relationship between an ejection volume Vd(pl) and a print duty of the reaction liquid when print resolutions Rx and Ry are 600 and 600, respectively.

In FIGS. 16 to 18, the region between the upper line and the lower line is a region (OK region) corresponding to conditions satisfying coloring property, fixing ability, bleeding and show through of color. An expression obtained by correcting the expression derived from the power approximation so as to satisfy the OK regions in these three graphs, so as to be inversely proportional to the print resolutions (Rx, Ry) is the expression 1.

As described below, the expression 1 defines optimum reaction-liquid-ejecting conditions when the print duty (hereinafter referred to as "ink duty") of an ink is 100%. Accordingly, the expression 1 must be always satisfied when the ink duty is 100%. However, the expression 1 may not be necessarily satisfied when the ink duty is not 100%. The present invention may be only required to be such a mode as satisfying the expression 1 when at least the ink duty is 100% and is sufficed so far as the conditions for ejecting the reaction liquid to the prescribed area where the ink duty is 100% satisfy the relationship of the expression 1. It goes without saying that the present invention may be a mode always satisfying the expression 1 irrespective of the ink duty.

The above-described recording process that is a prerequisite features that optimum recording conditions for solving various problems of coloring property, fixing ability, bleeding and show through of color as to printed articles are not defined by the correlation between the amount of the reaction liquid applied and the amount of the color pigment ink applied, but determined by the amount of the reaction liquid applied. The reason for it is that a feature of the ink-jet recording process that is a prerequisite resides in that the filmy aggregate is instantly formed at the interface where the reaction liquid has come into contact with the color pigment ink, and the contact interface is considered not to depend on the amount of the color pigment ink applied, but to depend on an area of a position to which the ink is applied. Therefore, the amount of the reaction liquid applied is constant irrespective of the amount of color pigment inks applied for a secondary color or tertiary color and consequently may be the same as the amount applied for a primary color.

When the print duty of the reaction liquid exceeds the right side of the expression 1, droplets of the reaction liquid do not retain a dot form, and the surface of the recording medium is in a wetted state with the reaction liquid. When this state is roughly estimated in terms of a rate of covering that is a proportion of covering the surface of the recording medium with the reaction liquid, it is approximately 100%. At this time, according to the above-described recording process that is a prerequisite, agglomerates of the pigment ink having come into contact with the reaction liquid migrate together along a flow of the surfactant in the pigment ink migrating on the interface of the reaction liquid. Therefore, when a dot of a different color is arranged adjoiningly, the resulting printed article seems to cause bleeding. In addition, it takes a long time to fix due to a great amount of the reaction liquid, and so a problem is also caused on fixing ability.

When the print duty is less than the left side of the expression 1 on the other hand, the droplets of the reaction liquid retain a dot form and are present independently of one another without coming into contact with adjoining dots, so that a large amount of an unreacted pigment ink comes to be present because image formation with the pigment ink is made on areas where no reaction liquid is present. By this fact, the coloring property and anti-bleeding property are deteriorated, and the show through of color occurs.

The reaction liquid used in the present invention will now be described. As the most preferable examples of a reactant contained in the reaction liquid in the present invention, may be mentioned polyvalent metal salts. A polyvalent metal salt is formed from a divalent or higher polyvalent metal ion and a negative ion bonded to the polyvalent metal ion. Specific examples of the polyvalent metal ion include divalent metal ions such as $Ca^{2+}$, $Cu^{2+}$, $Ni^{2+}$, $Mg^{2+}$ and $Zn^{2+}$, and trivalent metal ions such as $Fe^{3+}$ and $Al^{3+}$. Examples of the negative ion include $Cl^-$, $NO_3^-$ and $SO_4^{2-}$. In order to form an aggregate film in a moment at the interface where the reaction liquid has come into contact with the color pigment ink, it is necessary to cause both components to react in a moment. For example, the overall charge concentration of the polyvalent metal ion in the reaction liquid is desirably controlled to at least twice as much as the overall charge concentration of an ion having a reversed polarity in the color pigment ink.

The reaction liquid used in the present invention may be any liquid so far as it contains such a reactant as described above and is applied to the recording medium to form a good image with the color pigment ink subsequently applied. For example, a liquid obtained by dissolving the above-described reactant in water or an aqueous liquid medium composed of water and a water-soluble organic solvent is preferred. Examples of the water-soluble organic solvent used herein include amides such as dimethylformamide and dimethylacetamide; ketones such as acetone; ethers such as tetrahydrofuran and dioxane; polyalkylene glycols such as polyethylene glycol and polypropylene glycol; alkylene glycols such as ethylene glycol, propylene glycol, butylene glycol, triethylene glycol, thiodiglycol, hexylene glycol and diethylene glycol; lower alkyl ethers of polyhydric alcohols, such as ethylene glycol methyl ether, diethylene glycol monomethyl ether and triethylene glycol monomethyl ether; monohydric alcohols such as ethanol, isopropyl alcohol, n-butyl alcohol and isobutyl alcohol; and besides, 1,2,6-hexanetriol, glycerol, N-methyl-2-pyrrolidone, 1,3-dimethylimidazolidinone, triethanolamine, sulfolane and dimethyl sulfoxide. No particular limitation is imposed on the content of the water-soluble organic solvent in the reaction liquid in the present invention. However, it is preferably within a range of from 5 to 60% by mass, more preferably from 5 to 40% by mass based on the total mass of the reaction liquid.

Besides the above components, additives such as viscosity modifiers, pH adjustors, preservatives and antioxidants may be suitably incorporated into the reaction liquid used in the present invention as needed. However, attention must be paid to the selection and amount added of the surfactant functioning as the penetration accelerator from the viewpoint of suitably controlling the penetrability of the reaction liquid with respect to the recording medium. The reaction liquid used in the present invention is preferably colorless, but may be palely colored within limits not changing the color tones of color inks when mixed with the respective inks on the recording medium. The reaction liquid used in the present invention is preferably adjusted so as to have a viscosity within a range of from 1 to 30 cP at about 25° C.

The color pigment inks in the present invention will now be described. A pigment in a color pigment ink used in the present invention is used in a range of from 1 to 20% by mass, preferably from 2 to 12% by mass based on the total mass of the color pigment ink. Specifically, as the pigment used in the present invention, carbon black may be mentioned for a black pigment. As such carbon black, there may preferably be used, for example, those produced in accordance with the furnace process or channel process and having such properties that the primary particle diameter is 15 to 40 mμ (nm), the specific surface area is 50 to 300 $m^2/g$ as determined in accordance with the BET method, the oil absorption is 40 to 150 ml/100 g as determined by using DBP, the volatile matter is 0.5 to 10%, and the pH is 2 to 9. Examples of commercially-available carbon black having such properties include No. 2300, No. 900, MCF88, No. 33, No. 40, No. 45, No. 52, MA7, MA8 and No. 2200B (all, products of Mitsubishi Chemical Industries Limited), RAVEN 1255 (product of Columbian Carbon Co.), REGAL 400R, REGAL 330R, REGAL 660R and MOGUL L (all, products of Cabot Company), and Color Black FW1, Color Black FW18, Color Black S170, Color Black S150, Printex 35 and Printex U (all, products of Degussa AG). All these commercially-available carbon black products may preferably be used.

Examples of pigments used in yellow inks include C.I. Pigment Yellow 1, C.I. Pigment Yellow 2, C.I. Pigment Yellow 3, C.I. Pigment Yellow 13, C.I. Pigment Yellow 16 and C.I. Pigment Yellow 83. Examples of pigments used in magenta inks include C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 112 and C.I. Pigment Red 122. Examples of pigments used in cyan inks include C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4 and C.I. Vat Blue 6. However, the pigments are not limited to these pigments. It goes without saying that pigments newly prepared, such as self-dispersing pigments, may also be used in addition to the above pigments.

The color pigment inks usable in the present invention may contain a dispersing agent for such pigments as described above. As the dispersing agent used in this case, any dispersing agent may be used so far as it is a water-soluble resin. However, those having a weight average molecular weight ranging from 1,000 to 30,000, more preferably from 3,000 to 15,000 may preferably be used. Specific examples of such dispersing agents include block copolymers, random copolymers and graft copolymers composed of at least two monomers (at least one monomer being a hydrophilic polymerizable monomer) selected from styrene, styrene derivatives, vinylnaphthalene, vinylnaphthalene derivatives, aliphatic alcohol esters of α,β-ethylenically unsaturated carboxylic acids, acrylic acid, acrylic acid derivatives, maleic acid, maleic acid derivatives, itaconic acid, itaconic acid derivatives, fumaric acid, fumaric acid derivatives, vinyl acetate, vinylpyrrolidone, acrylamide and derivatives thereof, and the like, and salts of these copolymers. Besides, natural resins such as rosin, shellac and starch may also preferably be used. These resins are alkali-soluble resins which dissolve in an aqueous solution of a base. These water-soluble resins used as a pigment dispersant may preferably be contained in a range of from 0.1 to 5% by mass based on the total mass of the color pigment ink.

In the case of the color pigment ink containing such a pigment as mentioned above, it is particularly desirable that the color pigment ink be adjusted to be neutral or alkaline as the whole because the solubility of the water-soluble resin used as the dispersing agent for the pigment is improved, so that the ink can be provided as an ink far excellent in long-term storability. In this case, however, it is desirable that the pH be adjusted to a range of preferably from 7 to 10 in view of the possibility that various parts used in an ink-jet recording apparatus may be corroded. Examples of a pH adjustor used in such a case include various kinds of organic amines such as diethanolamine and triethanolamine, inorganic alkalis such as the hydroxides of alkali metals, for example, sodium hydroxide, lithium hydroxide and potassium hydroxide, organic acids, and mineral acids. Such a pigment and a water-soluble resin that is a dispersing agent as described above are dispersed or dissolved in an aqueous liquid medium.

The color pigment inks used in the present invention are prepared by dispersing or dissolving the pigment and the dispersing agent used as needed in the aqueous liquid medium. A solvent suitable for the aqueous liquid medium is a mixed solvent of water and a water-soluble organic solvent. As the water, it is preferable to use ion-exchanged water (deionized water) instead of tap water containing various ions.

Examples of the water-soluble organic solvent used in combination with water include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and keto-alcohols such as acetone and diacetone alcohol; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol monomethyl (or monoethyl) ether, diethylene glycol methyl (or ethyl) ether and triethylene glycol monomethyl (or monoethyl) ether; N-methyl-2-pyrrolidone; 2-pyrrolidone; and 1,3-dimethyl-2-imidazolidinone. Among a number of these water-soluble organic solvents, polyhydric alcohols such as diethylene glycol and lower alkyl ethers of polyhydric alcohols, such as triethylene glycol monomethyl (or monoethyl) ether are preferred.

The content of such a water-soluble organic solvent as described above in the color pigment ink is generally within a range of from 3 to 50% by mass, preferably from 3 to 40% by mass based on the total mass of the color pigment ink, while the content of water used is within a range of from 10 to 90% by mass, preferably from 30 to 80% by mass based on the total mass of the color pigment ink.

Besides the above components, a surfactant, antifoaming agent, preservative and/or the like may be suitably added to the color pigment inks used in the present invention, as needed, in order to provide them as inks having desired physical properties. In particular, the surfactant functioning as a penetration accelerator plays the role of rapidly penetrating the liquid components in the reaction liquid and color pigment inks into the recording medium in the third step, and so it is necessary to add it in a proper amount sufficient to play such a role. As an example of the amount added, 0.05 to 10% by mass, preferably 0.5 to 5% by mass is preferred. As examples of preferably usable anionic surfactants, may be mentioned all surfactants of the carboxylic acid salt, sulfate, sulfonic acid salt and phosphate types generally used.

Each of the color pigment inks composed of such components as described above is prepared in the following manner. The pigment is first added to an aqueous medium containing at least the water-soluble resin as a dispersing agent and water, and the mixture is stirred. A dispersion treatment is then conducted by means of dispersing means described below, and as needed, a centrifugation is carried out to obtain a desired dispersion. A sizing agent and such suitably selected additive components as mentioned above are then added to the dispersion. The resultant mixture is stirred to prepare a color pigment ink used in the present invention.

When such an alkali-soluble resin as described above is used as a dispersing agent, it is necessary to add a base for dissolving the resin in the dispersion. Preferable examples of the base used in this case include organic amines such as monoethanolamine, diethanolamine, triethanolamine and amine methylpropanol, ammonia, and inorganic bases such as potassium hydroxide and sodium hydroxide.

In the preparation process of the color pigment inks, it is effective to conduct premixing for at least 30 minutes before the aqueous medium containing the pigment is stirred to subject it to a dispersion treatment. This premixing process is preferred because it serves to improve the wettability of the surface of the pigment and facilitate adsorption of the dispersing agent on the pigment surface.

Any dispersing machine generally used may be employed as a dispersing machine used in the dispersion treatment of the pigment. As examples thereof, may be mentioned ball mills, roll mills and sand mills. Of these mills, a high-speed sand mill may preferably be used. Examples thereof include Super Mill, Sand Grinder, Beads Mill, Agitator Mill, Grain Mill, Dyno Mill, Pearl Mill and Coball Mill (all, trade names).

In the case where the color pigment inks are used in an ink-jet recording method, a pigment having an optimum particle size distribution must be used from the viewpoint of resistance to clogging. As methods of obtaining a pigment having a desired particle size distribution, may be mentioned techniques in which the size of a grinding medium in a dispersing machine is made smaller, in which the packing rate of a grinding medium is made higher, in which processing time is made longer, in which a discharging rate is made lower, and in which classification is conducted by filter, centrifugal separator or the like after grinding. Any combination thereof may also be included.

The ink-jet recording process, to which the reaction liquid and color pigment inks described above are applied, will now be described. Specific examples of the constructions of a cartridge, recording unit and ink-jet recording apparatus preferably applied to the process, and a liquid-ejecting head preferably used in these apparatus will be additionally described.

Figure 1:
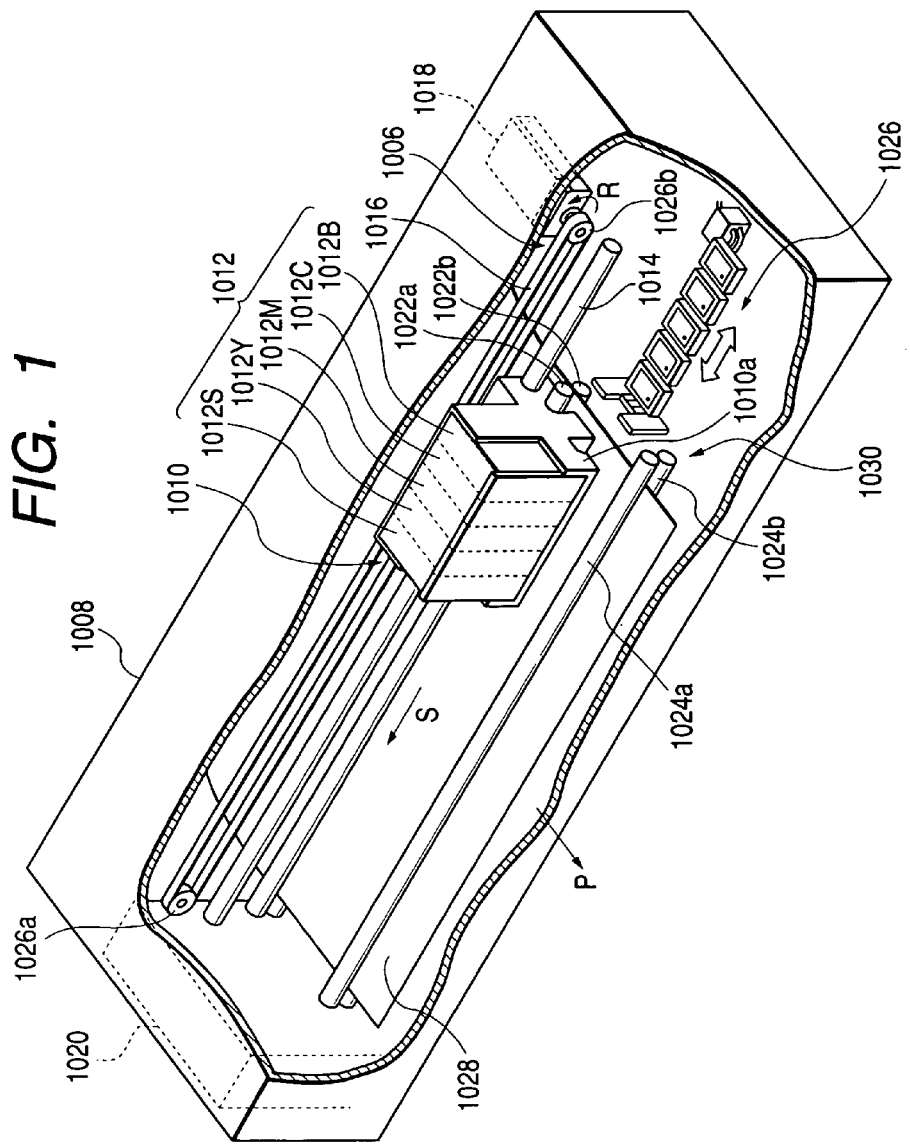
FIG. 1 is a schematic perspective view illustrating an exemplary ink-jet printer.

FIG. 1 is a schematic perspective view illustrating principal parts of an exemplary ink-jet recording apparatus which can be used in the present invention.

In FIG. 1, the ink-jet recording apparatus comprises a feeding part 1030 for intermittently feeding paper 1028 as a recording medium provided along a longitudinal direction within a casing 1008 in a direction indicated by an arrow P in the drawing, a recording part 1010 reciprocatively moved substantially parallel to a direction of an arrow S substantially perpendicular to the feeding direction P of the paper 1028 by the feeding section 1030 along a guide rod 1014, and a driving part 1006 for movement as a driving means for reciprocatively moving the recording part 1010.

The driving part 1006 for movement comprises a belt 1016 wound around pulleys 1026a and 1026b respectively provided on rotating shafts oppositely arranged at a prescribed interval, two pairs of roller units 1022a/1022b and 1024a/1024b and a motor 1018 for driving the belt 1016 joined to a carriage member 1010a of the recording part 1010 arranged substantially parallel to the roller units in forward and reverse directions.

When the motor 1018 is operated to rotate the belt 1016 in a direction indicated by an arrow R in FIG. 1, the carriage member 1010a of the recording part 1010 is moved by the prescribed movement in the direction indicated by the arrow S in FIG. 1. When the motor 1018 is operated to rotate the belt 1016 in a direction reverse to the direction indicated by the arrow R in FIG. 1, the carriage member 1010a of the recording part 1010 is moved by the prescribed movement in a direction reverse to the direction of the arrow S in FIG. 1. At an end of the driving part 1006 for movement, a recovery unit 1026 for conducting an ejection-recovery process for the recording part 1010 is provided in opposed relation to an array of ink-ejection openings of the recording part 1010 at a position that becomes a home position of the carriage member 1010a.

The recording part 1010 comprises ink-jet cartridges (hereinafter may be referred merely to as "cartridges" in some cases) 1012 and the carriage member 1010a. The ink-jet cartridges are detachably mounted on the carriage member 1010a. The cartridges 1012Y, 1012M, 1012C and 1012B correspond to color pigment inks of yellow, magenta, cyan and black, respectively, and the cartridge 1012S corresponds to a reaction liquid.

The ink-jet recording apparatus having such construction is preset so as to satisfy the expression 1 as to the conditions (ejection volume Vd of the reaction liquid, print resolutions Rx, Ry of the reaction liquid, print duty of the reaction liquid) for ejecting the reaction liquid.

Figure 2:
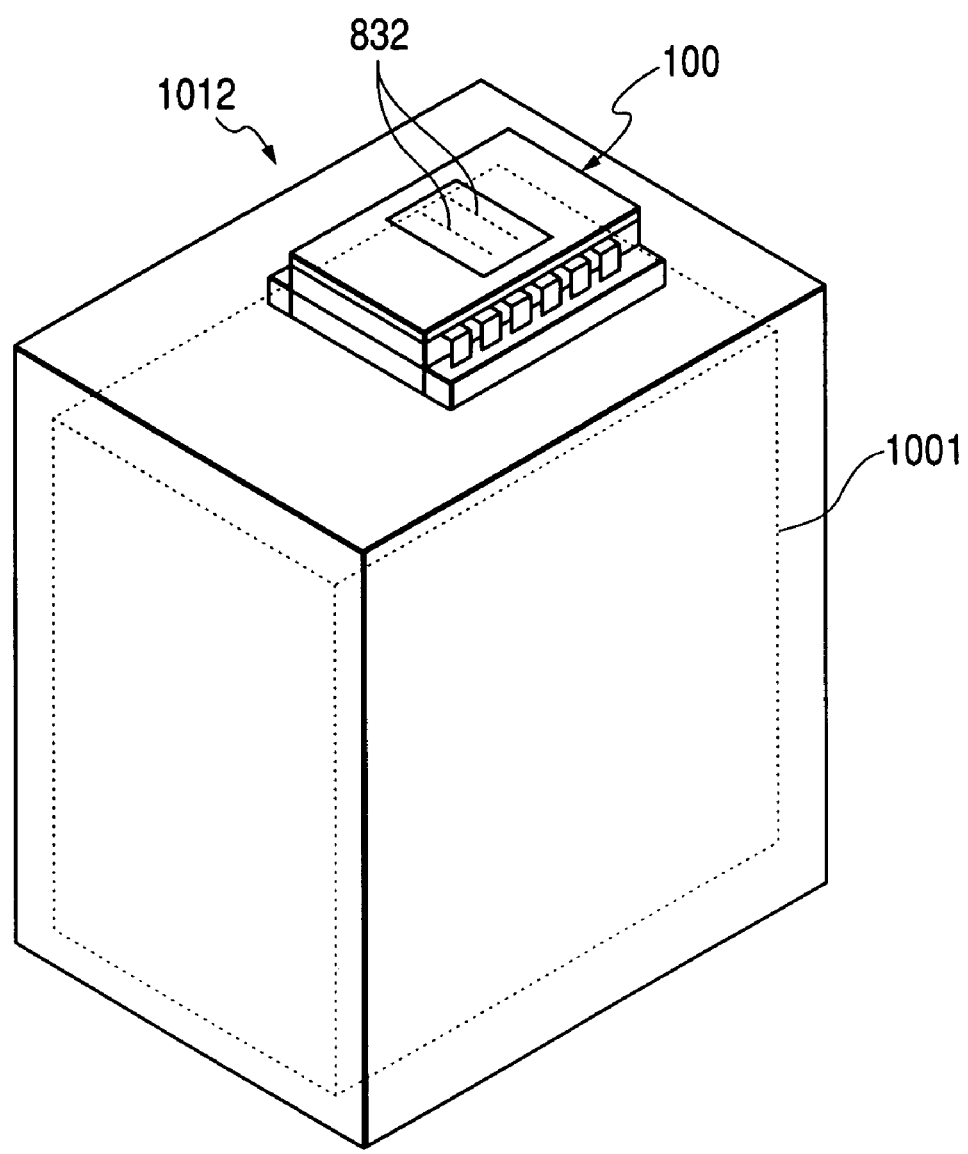
FIG. 2 is a schematic perspective view illustrating an exemplary ink-jet cartridge.

FIG. 2 illustrates an exemplary ink-jet cartridge capable of being mounted on the above-described ink-jet recording apparatus. The cartridge 1012 in this embodiment is of a serial type, and its principal part is constructed by an ink-jet recording head (hereinafter also referred to as "liquid-ejecting head") 100 and a liquid tank 1001 for containing a liquid such as an ink or reaction liquid.

In the ink-jet recording head 100, a great number of ejection openings 832 for ejecting the liquid such as an ink or reaction liquid is formed, and the liquid such as an ink or reaction liquid is directed to a common liquid chamber (see FIG. 3) in the liquid-ejecting head 100 through a liquid feed passage (not illustrated) from the liquid tank 1001. The cartridge 1012 shown in FIG. 2 is so constructed that the ink-jet recording head 100 and the liquid tank 1001 are integrally formed, and the liquid can be supplied to the interior of the liquid tank 1001 as needed. However, a structure that the liquid tank 1001 is replaceably joined to this liquid-ejecting head 100 may also be adopted.

Figure 3:
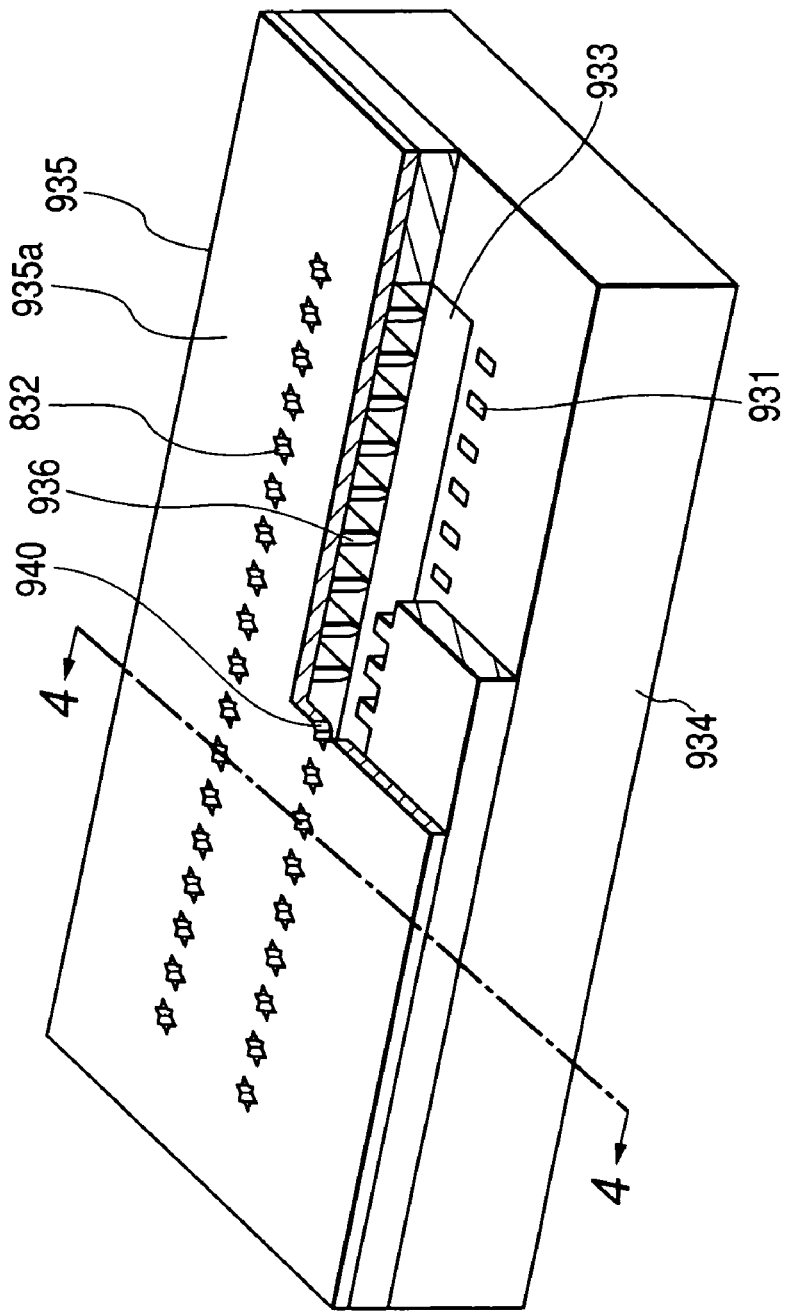
FIG. 3 is a typical schematic perspective view illustrating an exemplary liquid-ejecting head.

A specific example of the above-described liquid-ejecting head capable of being mounted on the ink-jet recording apparatus of such construction will hereinafter be described in detail. FIG. 3 is a schematic perspective view typically illustrating principal parts of a liquid-ejecting head suitable for use in the ink-jet recording apparatus usable in the present invention. Incidentally, electrical wiring and the like for driving electrothermal conversion elements are omitted in FIG. 3.

For the liquid-ejecting head used in the present invention, for example, a substrate 934 composed of glass, ceramic, plastic, metal or the like as illustrated in FIG. 3 is used. A material of such a substrate is not essential to the present invention and is not particularly limited so far as it functions as a part of a flow-path forming member and as a support for an ink ejection-energy-generating element and a material layer for forming a liquid flow path and ejection openings, which will be described subsequently. Therefore, in this embodiment, the description is given in the case where a Si substrate (wafer) is used. The ink ejection openings are formed in such a substrate 934. Examples of a process for forming them include a forming process by laser beam, and besides a process in which a photosensitive resin is used as an orifice plate (ejection-opening plate) 935, which will be described subsequently, to form ejection openings by an aligner such as MPA (mirror projection aligner).

In FIG. 3, reference numeral 934 indicates a substrate equipped with electrothermal conversion elements (hereinafter may be referred as "heater" in some cases) 931 and an ink feed opening 933 formed of a long-grooved through-opening as a common liquid chamber. The heaters 931, which are thermal energy-generating means, are arranged in a zigzag form in a row on both sides of the ink feed opening 933 along a longitudinal direction thereof with an interval of, for example, 600 dpi between the electrothermal conversion elements. Walls 936 for forming ink flow paths are provided on the substrate 934. Further, an ejection-opening plate 935 equipped with ejection openings 832 is provided on the walls 936 for ink flow paths.

In FIG. 3, the walls 936 for ink flow paths and the ejection-opening plate 935 are illustrated as separate members. However, the walls 936 for ink flow paths may be formed on the substrate 934 by a method such as spin coating, thereby forming the walls 936 for ink flow paths and the ejection-opening plate 935 as the same member at the same time. In this embodiment, the side of the ejection-opening face (upper surface) 935a is subjected to a water-repellency treatment.

In the apparatus illustrated, a head of the serial type in which recording is conducted while scanning in the direction of the arrow S in FIG. 1, is used to conduct recording at, for example, 1,200 dpi. The driving frequency is 10 kHz, and ejection is conducted at the shortest time interval of 100 μs in one ejection opening.

An ejecting operation of a liquid by the ink-jet recording head of the above-described construction will hereinafter be described with reference to FIGS. 4 to 11. FIGS. 4 to 11 are cross-sectional views for explaining the ejecting operation of a liquid by the liquid-ejecting head shown in FIG. 3 and are cross-sectional views taken along line 4—4 in FIG. 3. In this section, an end of the ejection opening part 940 in the thickness-wise direction of the orifice plate is a top 1141a of a groove 1141.

Figure 4:
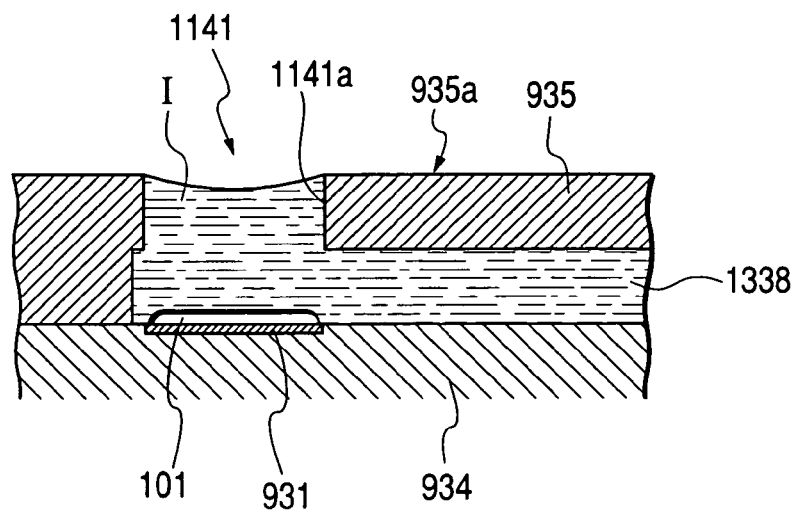
FIG. 4 is a schematic cross-sectional view for explaining a liquid-ejecting operation of the liquid-ejecting head with time corresponding to a section taken along line 4—4 in FIG. 3.

FIG. 4 illustrates a state that a film-like bubble has been formed on the heater, and FIGS. 5, 6, 7, 8, 9, 10 and 11 illustrate states after about 1 μs from the state in FIG. 4, after about 2 μs from the state in FIG. 4, after about 3 μs from the state in FIG. 4, after about 4 μs from the state in FIG. 4, after about 5 μs from the state in FIG. 4, after about 6 μs from the state in FIG. 4 and after about 7 μs from the state in FIG. 4, respectively. Incidentally, in the following description, "drop" or "drop-in" does not mean drop in the so-called gravity direction, but means movement in the direction of an electrothermal conversion element irrespective of the installing direction of a head.

Figure 5:
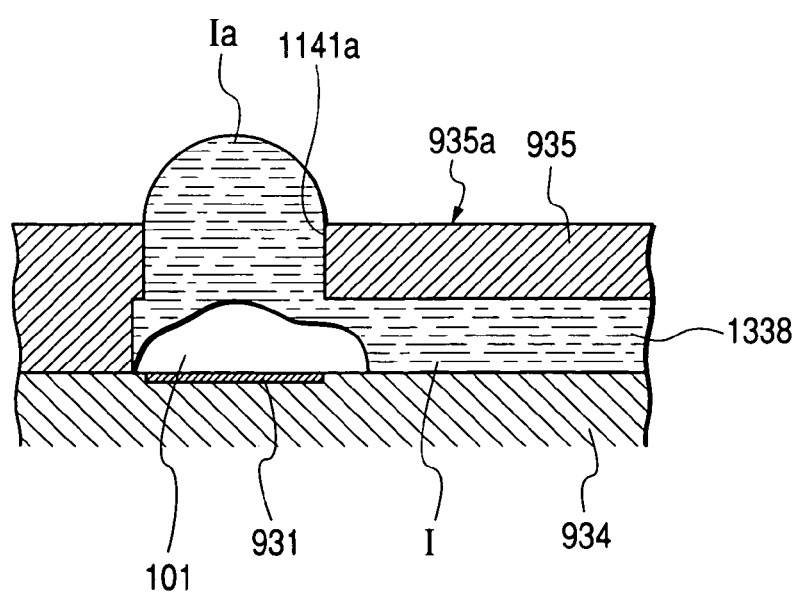
FIG. 5 is a schematic cross-sectional view for explaining a liquid-ejecting operation of the liquid-ejecting head with time corresponding to the section taken along line 4—4 in FIG. 3.
Figure 6:
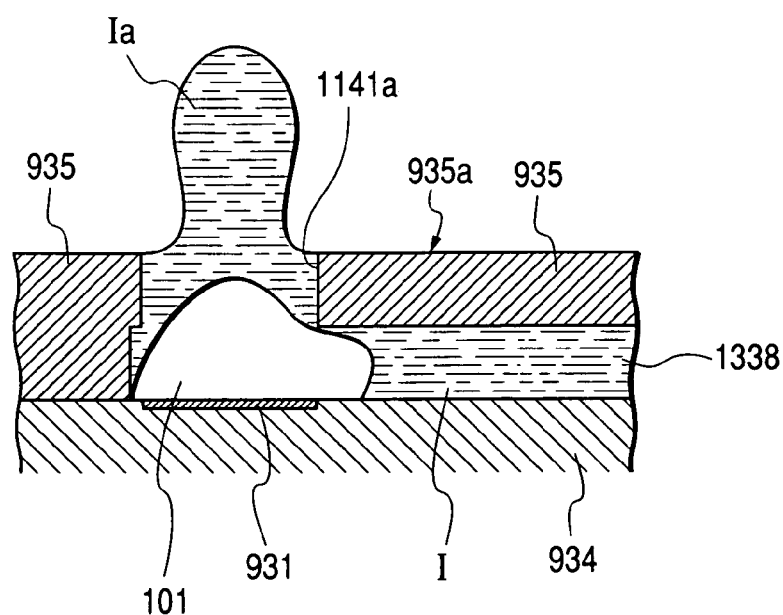
FIG. 6 is a schematic cross-sectional view for explaining a liquid-ejecting operation of the liquid-ejecting head with time corresponding to the section taken along line 4—4 in FIG. 3.

When a bubble 101 is first formed in a liquid flow path 1338 on a heater 931 by energizing the heater 931 on the basis of a recording signal or the like as illustrated in FIG. 4, the bubble quickly volumetrically expands and grows during about 2 μs as illustrated in FIGS. 5 and 6. The height of the bubble 101 in the greatest volume exceeds the face 935a of an ejection opening. At this time, the pressure of the bubble decreases from one over several to one over ten and several as low as the atmospheric pressure.

Figure 7:
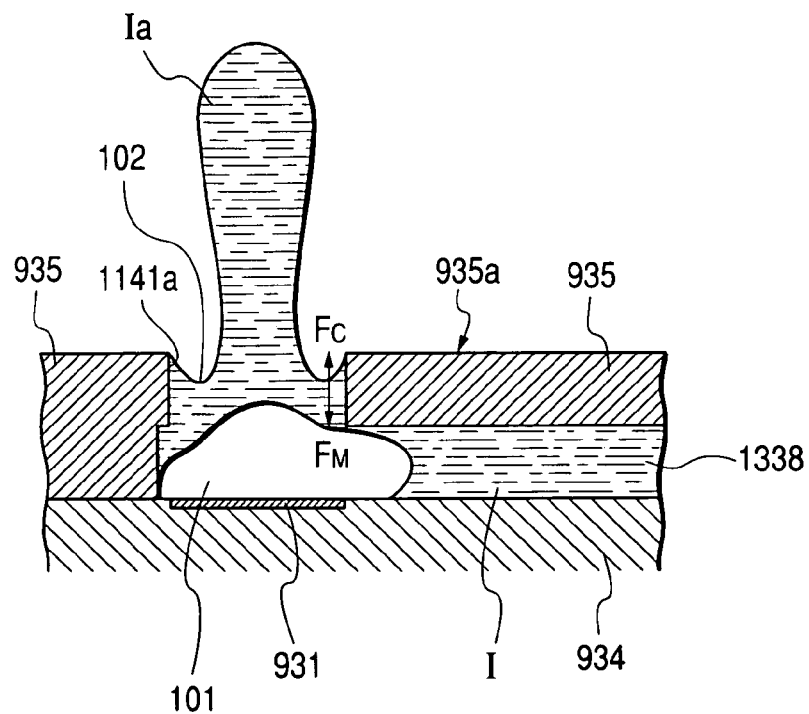
FIG. 7 is a schematic cross-sectional view for explaining a liquid-ejecting operation of the liquid-ejecting head with time corresponding to the section taken along line 4—4 in FIG. 3.

At the time about 2 μs have elapsed from the formation of the bubble, the volume of the bubble 101 turns from the greatest volume to decreased volume as described above, and at substantially the same time as this, the formation of a meniscus 102 is started. The meniscus 102 also recedes, i.e., drops in the direction of the heater 931 as illustrated in FIG. 7. In this embodiment, the ejection opening part of the liquid-ejecting head illustrated has a plurality of grooves 1141 in a dispersed state, whereby capillary force acts in the opposite direction $F_C$ to the receding direction $F_M$ of the meniscus at the portion of the groove 1141 when the meniscus 102 recedes. As a result, the forms of the meniscus and a main droplet (hereinafter may be referred to as "liquid" or "ink" in some cases) $I_a$ when the meniscus recedes are compensated so as to give substantially symmetrical forms to the center of the ejection opening even if some variation is observed in the state of the bubble 101 by some causes.

Figure 8:
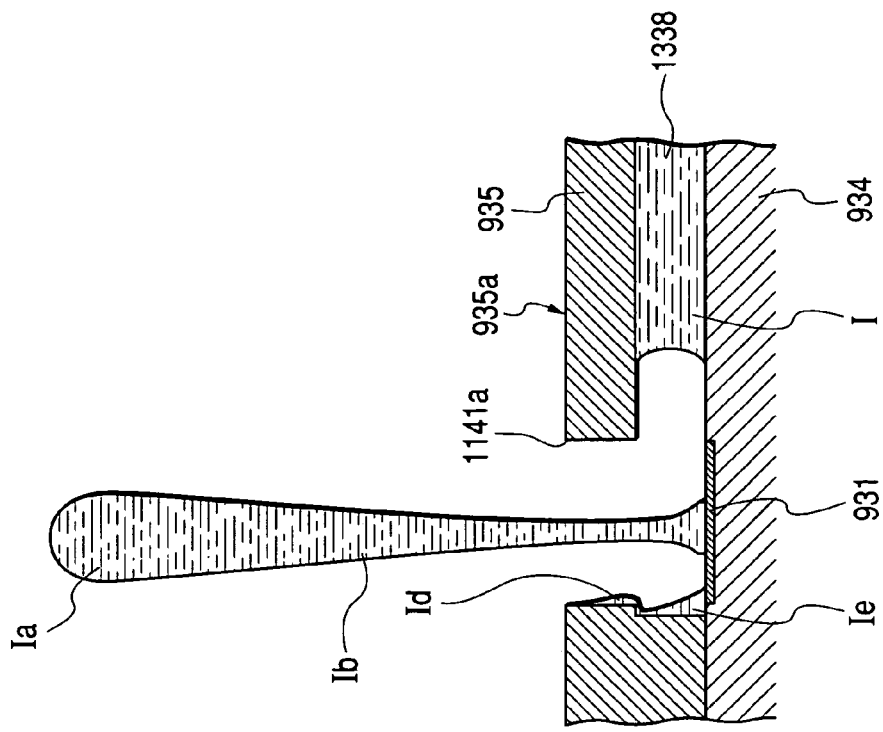
FIG. 8 is a schematic cross-sectional view for explaining a liquid-ejecting operation of the liquid-ejecting head with time corresponding to the section taken along line 4—4 in FIG. 3.

In the liquid-ejecting head illustrated, the dropping velocity of this meniscus 102 is faster than the contracting velocity of the bubble 101, so that the bubble 101 communicates with the air in the vicinity of the lower surface of the ejection opening 832 at the time about 4 μs have elapsed from the formation of the bubble as illustrated in FIG. 8. At this time, the liquid (ink) in the vicinity of the central axis of the ejection opening 832 drops toward the heater 931 because the liquid (ink) $I_a$ pulled back on the side of the heater 931 by the negative pressure of the bubble 101 before the communication with the air retains the velocity in the direction toward the heater 931 by virtue of inertia even after the communication with the air.

Figure 9:
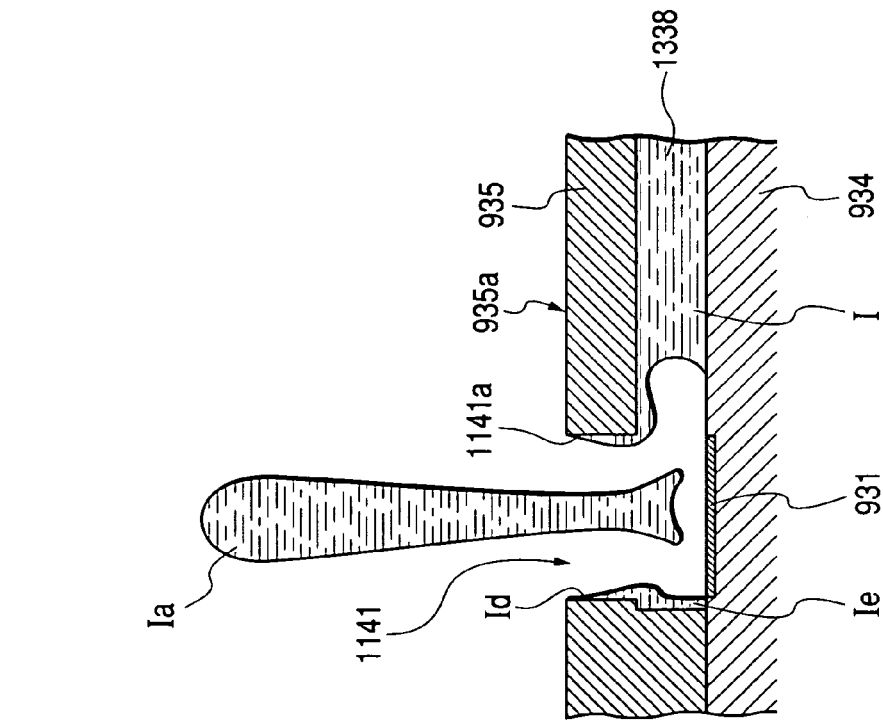
FIG. 9 is a schematic cross-sectional view for explaining a liquid-ejecting operation of the liquid-ejecting head with time corresponding to the section taken along line 4—4 in FIG. 3.

The liquid (ink) dropped toward the side of the heater 931 reaches the surface of the heater 931 at the time about 5 μs have elapsed from the formation of the bubble as illustrated in FIG. 9, and spreads so as to cover the surface of the heater 931 as illustrated in FIG. 10. The liquid spread so as to cover the surface of the heater 931 as described above has a vector in a horizontal direction along the surface of the heater 931. However, a vector in a direction intersecting the surface of the heater 931, for example, in the vertical direction vanishes, so that the liquid intends to remain on the surface of the heater 931, thereby pulling a liquid located on an upper side than such a liquid, i.e., a liquid keeping the velocity vector in the ejecting direction, downward.

Thereafter, a liquid portion $I_b$ between the liquid spread on the surface of the heater 931 and the liquid (main droplet) located on the upper side becomes thin, and is broken in the center of the surface of the heater 931 at the time about 7 μs have elapsed from the formation of the bubble as illustrated in FIG. 11, whereby the liquid is separated into a main droplet $I_a$ keeping the velocity vector in the ejecting direction and a liquid $I_c$ spread on the surface of the heater 931. The position of such separation is desirably the interior of the liquid flow path 1338, preferably the side closer to the electrothermal conversion element 931 than the ejection opening 832.

The main droplet $I_a$ is ejected from the central portion of the ejection opening 832 without deviation in the ejecting direction or ejection slippage and impacted at the prescribed position of a recording surface on a recording medium. The liquid $I_c$ spread on the surface of the heater 931 is ejected as a satellite droplet following the main droplet in the prior art. However, it remains on the surface of the heater 931 without being ejected.

Since the ejection of the satellite droplet can be prevented as described above, splash easy to occur by the ejection of the satellite droplet can be prevented, and staining of the recording surface on the recording medium with mist suspending in the form of fog can be surely prevented. In FIGS. 8 to 11, reference characters $I_d$ and $I_e$ indicate an ink (ink within the groove) attached to the groove portion and an ink remaining in the liquid flow path 1338, respectively.

As described above, in the liquid-ejecting head according to the embodiment illustrated, the direction of the main droplet upon ejection can be stabilized by the plural grooves dispersed to the center of the ejection opening when the liquid is ejected at the stage that the volume of the bubble decreases after growing into the greatest volume. As a result, a liquid-ejecting head free of slippage in the ejecting direction and high in impact accuracy can be provided. In addition, ejection can be stably conducted against the variation of bubbling at high driving frequency, whereby high-speed and high-definition printing can be realized.

In particular, in the liquid-ejecting head illustrated, the liquid is ejected by communicating the bubble with the air for the first time at the stage that the volume of the bubble decreases, whereby mist occurred upon the ejection of the droplet by communicating the bubble with the air can be prevented, so that the state that droplets attach to the ejection opening face, which forms the main cause of the so-called sudden ejection failure, can also be inhibited. As for another embodiment of the recording head of the ejection system that a bubble is communicated with the air upon ejection, may be mentioned the so-called edge shooter type as described in, for example, Japanese Patent Registration No. 2783647.

In particular, the recording process according to the present invention has excellent effects in recording heads and recording apparatus of an ink-jet system, in which thermal energy is utilized to form a droplet to be ejected, thereby conducting recording, among the ink-jet recording systems. With respect to the typical construction and principle thereof, those using the basic principle disclosed in, for example, U.S. Pat. Nos. 4,723,129 and 4,740,796 are preferred.

This system may be applied to any of the so-called On-Demand type and continuous type. In particular, the On-Demand type is effective because at least one driving signal which corresponds to recording information and gives a rapid temperature rise exceeding the film boiling is applied to an electrothermal converter arranged corresponding to a sheet or liquid path, in which a liquid (ink) is held, thereby causing the electrothermal converter to generate thermal energy to cause the film boiling on the heat-acting surface of a recording head, so that a bubble can be formed in the liquid (ink) in response to the driving signal in relation of one to one. The liquid (ink) is ejected through an ejection opening by the growth-contraction of this bubble to form at least one droplet. When the driving signal is applied in the form of a pulse, the growth-contraction of the bubble is suitably conducted in a moment, so that the ejection of the liquid (ink) excellent in responsiveness in particular can be achieved. It is therefore preferable to use such pulsed signals.

As for the pulsed driving signal, such signals as described in U.S. Pat. Nos. 4,463,359 and 4,345,262 are suitable. When the conditions described in U.S. Pat. No. 4,313,124 disclosing an invention relating to the rate of temperature rise on the heat-acting surface are adopted, far excellent recording can be conducted.

As for the construction of the recording head making up the ink cartridge, recording unit and ink-jet recording apparatus used in the present invention, constructions based on U.S. Pat. Nos. 4,558,333 and 4,459,600 which disclose the construction that a heat-acting part is arranged in a curved region may also be preferably used in addition to such combined constructions (linear liquid flow path or perpendicular liquid flow path) of ejection openings, a liquid flow path and electrothermal converters as disclosed in the above-described publications.

In addition, constructions based on Japanese Patent Application Laid-Open No. 59-123670 which discloses the construction that a slit common to a plurality of electrothermal converters are used as an ejection part of the electrothermal converters, and Japanese Patent Application Laid-Open No. 59-138461 which discloses the construction that an opening which absorbs pressure wave of thermal energy is provided in opposition to an ejection part may also be effective for the present invention.

In addition, a replaceable, chip type recording head in which electrical connection to an apparatus body and the feed of an ink from the apparatus body become feasible by installation in the apparatus body, or a cartridge type recording head in which an ink tank is provided integrally in a recording head itself may also be used.

Further, the addition of recovery means for a recording head, preliminary auxiliary means, etc. to the recording head, which is provided in the ink-jet recording apparatus that can be suitably applied to the present invention, is preferred because the effects of the present invention can be more stabilized. Specifically, capping means for the recording head, cleaning means, pressurizing or sucking means, preliminary heating means by electrothermal converters, other heating elements than these or combinations thereof, and preliminary ejection mode that ejection separate from recording is conducted may also be effective for stable recording.

In the present invention, such an ink-jet recording apparatus as illustrated in FIG. 1, i.e., the apparatus of the serial type in which formation of an image is conducted by repeating scanning of the recording head and feeding of the recording medium, is preferably used. However, the present invention is not limited thereto. For example, the present invention may also be applied to an apparatus of the line type, in which a full-line type recording head, in which a plurality of nozzles have been arranged over the overall width of a recording region of a recording medium, is used to conduct formation of an image. In either case of the serial type and line type, the direction of relative scanning followed by an ejecting operation of the reaction liquid corresponds to a recording direction.

The present invention will hereinafter be described more specifically by the following Examples and Comparative Examples. Incidentally, all designations of "part" or "parts" and "%" as will be used in the following examples mean part or parts by mass and % by mass unless expressly noted.

Color pigment inks of respective colors were first provided in the following manner.

(Preparation of Color Pigment Inks)

<Preparation of Pigment Dispersion>

| | |
|---|---|
| Styrene-acrylic acid-ethyl acrylate Copolymer (acid value: 240, weight average molecular weight: 5,000) | 1.5 parts |
| Monoethanolamine | 1.0 parts |
| Diethylene glycol | 5.0 parts |
| Ion-exchanged water | 81.5 parts. |

The above components were mixed and heated to 70° C. in a water bath, thereby completely dissolving the resin component. To this solution, were added 10 parts of carbon black (MCF88, trade name; product of Mitsubishi Chemical Industries Limited) newly prepared and 1 part of isopropyl alcohol to premix the components for 30 minutes. Thereafter, the resultant premix was subjected to a dispersing treatment under the following conditions.

Dispersing machine: Sand Grinder (trade named, manufactured by Igarashi Kikai K.K.)

Grinding medium: zirconium beads (diameter: 1 mm)

Packing rate of grinding medium: 50% (by volume)

Grinding time: 3 hours.

The thus-obtained dispersion was further subjected to a centrifugal treatment (12,000 rpm, 20 minutes) to remove coarse particles, thereby preparing a black pigment dispersion.

<Preparation of Color Pigment Ink K1>

The black pigment dispersion obtained above was used, and components having the following compositional ratio were mixed with the dispersion to prepare Color Pigment Ink K1 of black.

| | |
|---|---|
| Pigment dispersion prepared above | 30.0 parts |
| Glycerol | 10.0 parts |
| Ethylene glycol | 5.0 parts |
| N-Methylpyrrolidone | 5.0 parts |
| Ethyl alcohol | 2.0 parts |
| Acetylenol EH (trade name, product of Kawaken Fine Chemicals Co., Ltd.) | 1.0 part |
| Ion-exchanged water | 47.0 parts. |

<Preparation of Color Pigment Ink C1>

Color Pigment Ink C1 of cyan was prepared in the same manner as the preparation of Color Pigment Ink K1 except that 10 parts of carbon black (MCF88, trade name; product of Mitsubishi Chemical Industries Limited) used in the preparation of Color Pigment Ink K1 were changed to Pigment Blue 15.

<Preparation of Color Pigment Ink M1>

Color Pigment Ink M1 of magenta was prepared in the same manner as the preparation of Color Pigment Ink K1 except that 10 parts of carbon black (MCF88, trade name; product of Mitsubishi Chemical Industries Limited) used in the preparation of Color Pigment Ink K1 were changed to Pigment Red 7.

<Preparation of Color Pigment Ink Y1>

Color Pigment Ink Y1 of yellow was prepared in the same manner as the preparation of Color Pigment Ink K1 except that 10 parts of carbon black (MCF88, trade name; product of Mitsubishi Chemical Industries Limited) used in the preparation of Color Pigment Ink K1 were changed to Pigment Yellow 74.

(Preparation of Reaction Liquid)

The following components were mixed and dissolved, and the resultant solutions was then filtered under pressure through a membrane filter (Fluoropore Filter, trade name, product of Sumitomo Electric Industries, Ltd.) having a pore size of 0.22 μm, thereby obtaining Reaction Liquid S1.

<Composition of Reaction Liquid S1>

| | |
|---|---|
| Diethylene glycol | 10.0 parts |
| Methyl alcohol | 5.0 parts |
| Calcium chloride | 7.0 parts |
| Acetylenol EH (trade name, product of Kawaken Fine Chemicals Co., Ltd.) | 0.1 parts |
| Ion-exchanged water | 77.9 parts. |

The Reaction Liquid S1 and Color Pigment Inks K1, M1 and Y1 obtained above were used to prepare a 1 cm-square print for evaluation of coloring property, show through and fixing ability on PB paper (product of Canon Inc.), which is plain paper, by first applying Reaction Liquid S1 and then applying Color Pigment Inks K1, C1, M1 and Y1 by means of ink-jet recording heads. A print for evaluation of bleeding was prepared by combination of a back color and a character color in a similar manner, thereby regarding it as Print A1. The back color and character color were prepared by a combination of primary colors of Color Pigment Inks K1, C1, M1 and Y1 and secondary colors composed of a combination of these colors. Characters used in the evaluation were "電鷲" of the Ming-style type, and the size of characters was 8 point.

The recording heads used for Color Pigment Inks K1, C1, M1 and Y1 were those each having an ejection volume per dot of 4.5 pl and a recording density of 1,200 dpi that operation at 15 kHz is allowed. On the other hand, recording heads used for Reaction Liquid S1 were four heads whose ejection volumes per dot were 4.5 pl, 2.0 pl, 1.0 pl and 0.5 pl.

Recording conditions for Color Pigment Inks K1, C1, M1 and Y1 were such that recording was carried out at a print duty (application rate) of 100% to the recording density of 1,200 dpi. On the other hand, with respect to recording conditions for Reaction Liquid S1, recording was carried out by changing the ejection volume Vd(pl), resolution Rx(dpi) in the recording direction (direction of relative scanning), resolution Ry(dpi) in the arrangement direction of nozzles and print duty (duty) as shown in Table 1. Environment conditions in the printing tests were unified to 25° C./55% RH.

(Evaluation)

Evaluation was made in accordance with the following respective methods and standards.

1. Coloring Property:

After the prints obtained in the above-described manner were left to stand for 12 hours, the reflection density of each print was measured by a reflection densitometer, Macbeth RD19, (trade name, manufactured by Macbeth Company) to evaluate the coloring property of the print. The evaluation standard thereof is as follows:

"good": The reflection density was 1.20 or higher; and
"poor": The reflection density was lower than 1.20.

2. Show Through:

After the prints obtained in the above-described manner were left to stand for 12 hours, the reflection density of the back side of each print was measured by a reflection densitometer, Macbeth RD19, (trade name, manufactured by Macbeth Company) to evaluate the degree of show through. The evaluation standard thereof is as follows:

"good": The reflection density was lower than 0.10; and
"poor": The reflection density was 0.10 or higher.

3. Fixing Ability:

At the time 15 seconds elapsed from just after the printing, separate PB paper AO (trade name, product of Canon Inc.), on which no printing was conducted, was brought into close contact with the printed area to rub them with each other while a pressurized state of 35 g/cm$^2$ was retained, thereby visually observing whether color migration occurred or not to evaluate the fixing ability. The evaluation standard thereof is as follows:

"good": Color migration to the PB paper AO scarcely occurred (level causing no problem in actual use); and
"poor": Color migration to the PB paper AO occurred (level causing problems in actual use).

4. Bleeding:

An organoleptic test on visibility of the 8-point characters was conducted in accordance with the following standard to make evaluation as to bleeding.

"good": Level causing no problem in actual use; and
"poor": Level causing problems in actual use.

TABLE 1

Recording conditions of reaction liquid and evaluation results

| Example/Comp. Example | Ejection volume Vd (pl) | Resolution Rx (dpi) in recording direction | Resolution Ry (dpi) in arrangement direction of nozzles | Print duty (%) of reaction liquid | Coloring property | Bleeding | Fixing ability | Show through |
|---|---|---|---|---|---|---|---|---|
| Comp. Ex. 1 | 4.5 | 1200 | 1200 | 5% | poor | poor | good | poor |
| Comp. Ex. 2 | 4.5 | 1200 | 1200 | 10% | poor | poor | good | good |
| Example 1 | 4.5 | 1200 | 1200 | 15% | good | good | good | good |
| Example 2 | 4.5 | 1200 | 1200 | 25% | good | good | good | good |
| Comp. Ex. 3 | 4.5 | 1200 | 1200 | 30% | good | poor | good | good |
| Comp. Ex. 4 | 4.5 | 1200 | 1200 | 35% | good | poor | good | good |
| Comp. Ex. 5 | 4.5 | 1200 | 1200 | 40% | good | poor | good | good |
| Comp. Ex. 6 | 4.5 | 1200 | 1200 | 50% | good | poor | poor | good |
| Comp. Ex. 7 | 4.5 | 1200 | 1200 | 75% | good | poor | poor | good |
| Comp. Ex. 8 | 4.5 | 1200 | 1200 | 100% | good | poor | poor | good |
| Comp. Ex. 9 | 4.5 | 600 | 1200 | 10% | poor | poor | good | poor |
| Comp. Ex. 10 | 4.5 | 600 | 1200 | 25% | good | poor | good | good |
| Example 3 | 4.5 | 600 | 1200 | 30% | good | good | good | good |
| Example 4 | 4.5 | 600 | 1200 | 55% | good | good | good | good |
| Comp. Ex. 11 | 4.5 | 600 | 1200 | 60% | good | poor | good | good |
| Comp. Ex. 12 | 4.5 | 600 | 600 | 50% | poor | poor | good | good |
| Example 5 | 4.5 | 600 | 600 | 60% | good | good | good | good |
| Example 6 | 4.5 | 600 | 600 | 100% | good | good | good | good |
| Example 7 | 4.5 | 600 | 600 | 110% | good | good | good | good |
| Comp. Ex. 13 | 4.5 | 600 | 600 | 120% | good | poor | good | good |
| Comp. Ex. 14 | 2.0 | 1200 | 1200 | 5% | poor | poor | good | poor |
| Comp. Ex. 15 | 2.0 | 1200 | 1200 | 20% | poor | poor | good | good |
| Example 8 | 2.0 | 1200 | 1200 | 25% | good | good | good | good |
| Example 9 | 2.0 | 1200 | 1200 | 30% | good | good | good | good |
| Example 10 | 2.0 | 1200 | 1200 | 40% | good | good | good | good |
| Example 11 | 2.0 | 1200 | 1200 | 45% | good | good | good | good |
| Comp. Ex. 16 | 2.0 | 1200 | 1200 | 50% | good | poor | good | good |
| Comp. Ex. 17 | 2.0 | 600 | 1200 | 20% | poor | poor | good | poor |
| Comp. Ex. 18 | 2.0 | 600 | 1200 | 40% | poor | poor | good | good |
| Example 12 | 2.0 | 600 | 1200 | 50% | good | good | good | good |
| Example 13 | 2.0 | 600 | 1200 | 75% | good | good | good | good |
| Example 14 | 2.0 | 600 | 1200 | 90% | good | good | good | good |
| Comp. Ex. 19 | 2.0 | 600 | 1200 | 100% | good | poor | good | good |
| Comp. Ex. 20 | 2.0 | 600 | 600 | 50% | poor | poor | good | poor |
| Comp. Ex. 21 | 2.0 | 600 | 600 | 80% | poor | poor | good | good |
| Example 15 | 2.0 | 600 | 600 | 90% | good | good | good | good |
| Example 16 | 2.0 | 600 | 600 | 100% | good | good | good | good |
| Example 17 | 2.0 | 600 | 600 | 190% | good | good | good | good |
| Comp. Ex. 22 | 2.0 | 600 | 600 | 200% | good | poor | good | good |
| Comp. Ex. 23 | 1.0 | 1200 | 1200 | 10% | poor | poor | good | poor |
| Comp. Ex. 24 | 1.0 | 1200 | 1200 | 30% | poor | poor | good | good |
| Example 18 | 1.0 | 1200 | 1200 | 40% | good | good | good | good |
| Example 19 | 1.0 | 1200 | 1200 | 50% | good | good | good | good |
| Example 20 | 1.0 | 1200 | 1200 | 70% | good | good | good | good |
| Comp. Ex. 25 | 1.0 | 1200 | 1200 | 80% | good | poor | good | good |
| Comp. Ex. 26 | 1.0 | 600 | 1200 | 30% | poor | poor | good | poor |
| Comp. Ex. 27 | 1.0 | 600 | 1200 | 60% | poor | poor | good | good |
| Example 21 | 1.0 | 600 | 1200 | 70% | good | good | good | good |
| Example 22 | 1.0 | 600 | 1200 | 100% | good | good | good | good |
| Example 23 | 1.0 | 600 | 1200 | 145% | good | good | good | good |
| Comp. Ex. 28 | 1.0 | 600 | 1200 | 150% | good | poor | good | good |
| Comp. Ex. 29 | 0.5 | 1200 | 1200 | 15% | poor | poor | good | poor |
| Comp. Ex. 30 | 0.5 | 1200 | 1200 | 40% | poor | poor | good | good |
| Example 24 | 0.5 | 1200 | 1200 | 50% | good | good | good | good |
| Example 25 | 0.5 | 1200 | 1200 | 100% | good | good | good | good |
| Example 26 | 0.5 | 1200 | 1200 | 110% | good | good | good | good |
| Comp. Ex. 31 | 0.5 | 1200 | 1200 | 120% | good | poor | good | good |
| Comp. Ex. 32 | 0.5 | 2400 | 2400 | 10% | poor | poor | good | good |
| Example 27 | 0.5 | 2400 | 2400 | 20% | good | good | good | good |
| Example 28 | 0.5 | 2400 | 2400 | 25% | good | good | good | good |
| Comp. Ex. 33 | 0.5 | 2400 | 2400 | 30% | good | good | good | good |

It is understood from Table 1 that optimum conditions for satisfying all the coloring property, show through, fixing ability and anti-bleeding property that are an object of the present invention require that recording conditions for the reaction liquid satisfy the relationship of the expression 1

$$55 \times \frac{0.85 \times 10^6 \times Vd(pl)^{-0.61}}{Rx(dpi)Ry(dpi)} \leq \text{duty}(\%) \leq 125 \times \frac{0.85 \times 10^6 \times Vd(pl)^{-0.61}}{Rx(dpi)Ry(dpi)}$$

In the expression 1, Vd(pl) is an ejection volume per dot of the reaction liquid, Rx(dpi) is a print resolution in a recording direction (direction of relative scanning), Ry(dpi) is a print resolution in an arrangement direction of nozzles in a recording head, and duty(%) is a print duty of the reaction liquid. The expression 1 defines optimum reaction-liquid-ejecting conditions when the ink duty is 100%. Accordingly, the expression 1 must be always satisfied when the ink duty is 100%. However, the expression 1 may not be necessarily satisfied when the ink duty is not 100%. In a word, any mode may be included in the present invention so long as it satisfies the expression 1 when at least the ink duty is 100%. It goes without saying that a mode always satisfying the expression 1 irrespective of the ink duty is also included in the present invention.

According to the present invention, a recording process excellent in fixing ability and coloring property and reduced in the show through and bleeding can be realized.

What is claimed is:

1. An ink-jet recording process for conducting recording by ejecting a pigment ink and a reaction liquid containing a polyvalent metal salt from a recording section, in which a plurality of nozzles for ejecting the pigment ink and the reaction liquid are arranged, to a recording medium while relatively scanning the recording section to the recording medium, the process comprising the steps of:

ejecting the pigment ink having a surface tension lower than that of the reaction liquid to the reaction liquid ejected on the surface of the recording medium; and forming, on the surface of the reaction liquid, a filmy aggregate by gathering of pigment agglomerates produced by contact between the reaction liquid and the pigment ink, wherein, in said forming step, the pigment agglomerates migrate on the surface of the reaction liquid toward a boundary between the reaction liquid and the recording medium, and the gathering of the pigment agglomerates is formed along the surface of the reaction liquid by the migration of the pigment agglomerates, and thereby the filmy aggregate is formed on the surface of the reaction liquid, and wherein conditions for ejecting the reaction liquid in said ejecting step satisfy the relationship of $$55 \times \frac{0.85 \times 10^6 \times Vd(pl)^{-0.61}}{Rx(dpi)Ry(dpi)} \leq \text{duty}(\%) \leq 125 \times \frac{0.85 \times 10^6 \times Vd(pl)^{-0.61}}{Rx(dpi)Ry(dpi)}$$

wherein Vd(pl) is an ejection volume per dot of the reaction liquid, Rx(dpi) is a recording resolution in the direction of the relative scanning, Ry(dpi) is a recording resolution in the arrangement direction of the nozzles, and duty(%) is a recording duty of the reaction liquid.

2. An ink-jet recording process for conducting recording by ejecting a pigment ink and a reaction liquid containing a polyvalent metal salt from a recording section, in which a plurality of nozzles for ejecting the pigment ink and the reaction liquid are arranged, to a recording medium while relatively scanning the recording section to the recording medium, the process comprising the steps of:

ejecting the pigment ink having a surface tension lower than that of the reaction liquid to the reaction liquid ejected on the surface of the recording medium; and forming, on the surface of the reaction liquid, a filmy aggregate by gathering of pigment agglomerates produced by contact between the reaction liquid and the pigment ink, wherein, in said forming step, the pigment agglomerates migrate on the surface of the reaction liquid toward a boundary between the reaction liquid and the recording medium, and the gathering of the pigment agglomerates is formed along the surface of the reaction liquid by the migration of the pigment agglomerates, and thereby the filmy aggregate is formed on the surface of the reaction liquid, and wherein conditions for ejecting the reaction liquid to a prescribed area on the recording medium when at least the recording duty of the ink in the prescribed area is 100% satisfy the relationship of $$55 \times \frac{0.85 \times 10^6 \times Vd(pl)^{-0.61}}{Rx(dpi)Ry(dpi)} \leq \text{duty}(\%) \leq 125 \times \frac{0.85 \times 10^6 \times Vd(pl)^{-0.61}}{Rx(dpi)Ry(dpi)}$$

wherein Vd(pl) is an ejection volume per dot of the reaction liquid, Rx(dpi) is a recording resolution in the direction of the relative scanning, Ry(dpi) is a recording resolution in the arrangement direction of the nozzles, and duty(%) is a recording duty of the reaction liquid.

3. An ink-jet recording process for conducting recording on a recording medium by ejecting a pigment ink and a reaction liquid having a surface tension higher than that of the pigment ink and containing a polyvalent metal salt, which agglomerates the pigment ink, from a recording section, in which a plurality of nozzles for ejecting the pigment ink and the reaction liquid are arranged, to the recording medium while relatively scanning the recording section to the recording medium, the process comprising the steps of:

ejecting the reaction liquid to the recording medium; and ejecting the pigment ink to the recording medium in such a manner that the pigment ink is brought into contact with the reaction liquid present in a liquid state on the surface of the recording medium, wherein the pigment agglomerates, which are produced by contact between the reaction liquid and the pigment ink, migrate on the surface of the reaction liquid toward a boundary between the reaction liquid and the recording medium, and a series of the pigment agglomerates is formed along the surface of the reaction liquid by the migration of the pigment agglomerates, and thereby the filmy aggregate comprising the series of the pigment agglomerates is formed on the surface of the reaction liquid, and wherein conditions for ejecting the reaction liquid in the ejection step satisfy the relationship of $$55 \times \frac{0.85 \times 10^6 \times Vd(pl)^{-0.61}}{Rx(dpi)Ry(dpi)} \leq \text{duty}(\%) \leq 125 \times \frac{0.85 \times 10^6 \times Vd(pl)^{-0.61}}{Rx(dpi)Ry(dpi)}$$

wherein Vd(pl) is an ejection volume per dot of the reaction liquid, Rx(dpi) is a recording resolution in the direction of the relative scanning, Ry(dpi) is a recording resolution in the arrangement direction of the nozzles, and duty(%) is a recording duty of the reaction liquid.

4. An ink-jet recording process for conducting recording on a recording medium by ejecting a pigment ink and a reaction liquid having a surface tension higher than that of the pigment ink and containing a polyvalent metal salt, which agglomerates the pigment ink, from a recording section, in which a plurality of nozzles for ejecting the pigment ink and the reaction liquid are arranged, to the recording medium while relatively scanning the recording section to the recording medium, the process comprising the steps of:

ejecting the reaction liquid to the recording medium; and ejecting the pigment ink to the recording medium in such a manner that the pigment ink is brought into contact with the reaction liquid present in a liquid state on the surface of the recording medium, wherein the pigment agglomerates, which are produced by contact between the reaction liquid and the pigment ink, migrate on the surface of the reaction liquid toward a boundary between the reaction liquid and the recording medium, and a series of the pigment agglomerates is formed along the surface of the reaction liquid by the migration of the pigment agglomerates, and thereby the filmy aggregate comprising the series of the pigment agglomerates is formed on the surface of the reaction liquid, and wherein conditions for ejecting the reaction liquid to a prescribed area on the recording medium when at least the recording duty of the ink in the prescribed area is 100% satisfy the relationship of $$55 \times \frac{0.85 \times 10^6 \times Vd(pl)^{-0.61}}{Rx(dpi)Ry(dpi)} \leq \text{duty}(\%) \leq 125 \times \frac{0.85 \times 10^6 \times Vd(pl)^{-0.61}}{Rx(dpi)Ry(dpi)}$$

wherein Vd(pl) is an ejection volume per dot of the reaction liquid, Rx(dpi) is a recording resolution in the direction of the relative scanning, Ry(dpi) is a recording resolution in the arrangement direction of the nozzles, and duty(%) is a recording duty of the reaction liquid.

5. An ink-jet recording process for conducting recording by ejecting a reaction liquid containing a polyvalent metal salt and a surfactant and a pigment ink containing a surfactant in a higher content than that of the reaction liquid to a recording medium from a recording section, in which a plurality of nozzles for ejecting the reaction liquid and the pigment ink are arranged, while relatively scanning the recording section to the recording medium, the process comprising the steps of:

bringing the pigment ink into contact with the reaction liquid present on the surface of the recording medium; and forming, on the surface of the reaction liquid, a filmy aggregate by gathering of pigment agglomerates produced by contact between the reaction liquid and the pigment ink, wherein, in said forming step, the pigment agglomerates migrate on the surface of the reaction liquid toward a boundary between the reaction liquid and the recording medium, and the gathering of the pigment agglomerates is formed along the surface of the reaction liquid by the migration of the pigment agglomerates, and thereby the filmy aggregate is formed on the surface of the reaction liquid, and wherein conditions for ejecting the reaction liquid satisfy the relationship of $$55 \times \frac{0.85 \times 10^6 \times Vd(pl)^{-0.61}}{Rx(dpi)Ry(dpi)} \leq \text{duty}(\%) \leq 125 \times \frac{0.85 \times 10^6 \times Vd(pl)^{-0.61}}{Rx(dpi)Ry(dpi)}$$

wherein Vd(pl) is an ejection volume per dot of the reaction liquid, Rx(dpi) is a recording resolution in the direction of the relative scanning, Ry(dpi) is a recording resolution in the arrangement direction of the nozzles, and duty(%) is a recording duty of the reaction liquid.

6. An ink-jet recording process for conducting recording by ejecting a reaction liquid containing a polyvalent metal salt and a surfactant and a pigment ink containing a surfactant in a higher content than that of the reaction liquid to a recording medium from a recording section, in which a plurality of nozzles for ejecting the reaction liquid and the pigment ink are arranged, while relatively scanning the recording section to the recording medium, the process comprising the steps of:

bringing the pigment ink into contact with the reaction liquid present on the surface of the recording medium; and forming, on the surface of the reaction liquid, a filmy aggregate by gathering of pigment agglomerates produced by contact between the reaction liquid and the pigment ink, wherein, in said forming step, the pigment agglomerates migrate on the surface of the reaction liquid toward a boundary between the reaction liquid and the recording medium, and the gathering of the pigment agglomerates is formed along the surface of the reaction liquid by the migration of the pigment agglomerates, and thereby the filmy aggregate is formed on the surface of the reaction liquid, and wherein conditions for ejecting the reaction liquid to a prescribed area on the recording medium when at least the recording duty of the ink in the prescribed area is 100% satisfy the relationship of $$55 \times \frac{0.85 \times 10^6 \times Vd(pl)^{-0.61}}{Rx(dpi)Ry(dpi)} \leq \text{duty}(\%) \leq 125 \times \frac{0.85 \times 10^6 \times Vd(pl)^{-0.61}}{Rx(dpi)Ry(dpi)}$$

wherein Vd(pl) is an ejection volume per dot of the reaction liquid, Rx(dpi) is a recording resolution in the direction of the relative scanning, Ry(dpi) is a recording resolution in the arrangement direction of the nozzles, and duty(%) is a recording duty of the reaction liquid.

7. An ink-jet recording process for conducting recording by ejecting a reaction liquid containing a polyvalent metal salt and a pigment ink having a surface tension lower than that of the reaction liquid to a recording medium in that order from a recording section, in which a plurality of nozzles for ejecting the reaction liquid and the pigment ink are arranged, while relatively scanning the recording section to the recording medium, the process comprising the steps of:

bringing the reaction liquid into contact with the pigment ink on the surface of the recording medium; and forming, on the surface of the reaction liquid, a filmy aggregate by gathering of pigment agglomerates produced by contact between the reaction liquid and the pigment ink, wherein penetration of the reaction liquid into the recording medium is completed after the filmy aggregate is formed, and thereby the filmy aggregate covering a recessed portion between fibers of the recording medium is formed, and wherein conditions for ejecting the reaction liquid satisfy the relationship of $$55 \times \frac{0.85 \times 10^6 \times Vd(pl)^{-0.61}}{Rx(dpi)Ry(dpi)} \leq \text{duty}(\%) \leq 125 \times \frac{0.85 \times 10^6 \times Vd(pl)^{-0.61}}{Rx(dpi)Ry(dpi)}$$

wherein Vd(pl) is an ejection volume per dot of the reaction liquid, Rx(dpi) is a recording resolution in the direction of the relative scanning, Ry(dpi) is a recording resolution in the arrangement direction of the nozzles, and duty(%) is a recording duty of the reaction liquid.

8. An ink-jet recording process for conducting recording by ejecting a reaction liquid containing a polyvalent metal salt and a pigment ink having a surface tension lower than that of the reaction liquid to a recording medium in that order from a recording section, in which a plurality of nozzles for ejecting the reaction liquid and the pigment ink are arranged, while relatively scanning the recording section to the recording medium, the process comprising the steps of:

bringing the reaction liquid into contact with the pigment ink on the surface of the recording medium;

forming, on the surface of the reaction liquid, a filmy aggregate by gathering of pigment agglomerates produced by contact between the reaction liquid and the pigment ink, wherein penetration of the reaction liquid into the recording medium is completed after the filmy aggregate is formed, and thereby the filmy aggregate covering a recessed portion between fibers of the recording medium is formed, and wherein conditions for ejecting the reaction liquid to a prescribed area on the recording medium when at least the recording duty of the ink in the prescribed area is 100% satisfy the relationship of $$55 \times \frac{0.85 \times 10^6 \times Vd(pl)^{-0.61}}{Rx(dpi)Ry(dpi)} \leq \text{duty}(\%) \leq 125 \times \frac{0.85 \times 10^6 \times Vd(pl)^{-0.61}}{Rx(dpi)Ry(dpi)}$$

wherein Vd(pl) is an ejection volume per dot of the reaction liquid, Rx(dpi) is a recording resolution in the direction of the relative scanning, Ry(dpi) is a recording resolution in the arrangement direction of the nozzles, and duty(%) is a recording duty of the reaction liquid.

9. An ink-jet recording process for conducting recording on a recording medium by ejecting a pigment ink containing a surfactant and a reaction liquid containing a polyvalent metal salt, which agglomerates the pigment ink, from a recording section, in which a plurality of nozzles for ejecting the pigment ink and the reaction liquid are arranged, to the recording medium while relatively scanning the recording section to the recording medium, the process comprising the steps of:

ejecting the reaction liquid to the recording medium; and ejecting the pigment ink to the recording medium in such a manner that the pigment ink is brought into contact with the reaction liquid present in a liquid state on the surface of the recording medium, wherein the pigment agglomerates, which are produced by contact between the reaction liquid and the pigment ink, migrate on the surface of the reaction liquid toward a boundary between the reaction liquid and the recording medium, and a series of the pigment agglomerates is formed along the surface of the reaction liquid by the migration of the pigment agglomerates, and thereby the filmy aggregate comprising the series of the pigment agglomerates is formed on the surface of the reaction liquid, wherein the pigment ink contains the surfactant in a higher content than that in the reaction liquid, and wherein conditions for ejecting the reaction liquid in the ejection step satisfy the relationship of $$55 \times \frac{0.85 \times 10^6 \times Vd(pl)^{-0.61}}{Rx(dpi)Ry(dpi)} \leq \text{duty}(\%) \leq 125 \times \frac{0.85 \times 10^6 \times Vd(pl)^{-0.61}}{Rx(dpi)Ry(dpi)}$$

wherein Vd(pl) is an ejection volume per dot of the reaction liquid, Rx(dpi) is a recording resolution in the direction of the relative scanning, Ry(dpi) is a recording resolution in the arrangement direction of the nozzles, and duty(%) is a recording duty of the reaction liquid.

10. An ink-jet recording process for conducting recording on a recording medium by ejecting a pigment ink containing a surfactant and a reaction liquid containing a polyvalent metal salt, which agglomerates the pigment ink, from a recording section, in which a plurality of nozzles for ejecting the pigment ink and the reaction liquid are arranged, to the recording medium while relatively scanning the recording section to the recording medium, the process comprising the steps of:

ejecting the reaction liquid to the recording medium; and ejecting the pigment ink to the recording medium in such a manner that the pigment ink is brought into contact with the reaction liquid present in a liquid state on the surface of the recording medium, wherein the pigment agglomerates, which are produced by contact between the reaction liquid and the pigment ink, migrate on the surface of the reaction liquid toward a boundary between the reaction liquid and the recording medium, and a series of the pigment agglomerates is formed along the surface of the reaction liquid by the migration of the pigment agglomerates, and thereby the filmy aggregate comprising the series of the pigment agglomerates is formed on the surface of the reaction liquid, wherein the pigment ink contains the surfactant in a higher content than that in the reaction liquid, and wherein conditions for ejecting the reaction liquid to a prescribed area on the recording medium when at least the recording duty of the ink in the prescribed area is 100% satisfy the relationship of $$55 \times \frac{0.85 \times 10^6 \times Vd(pl)^{-0.61}}{Rx(dpi)Ry(dpi)} \leq \text{duty}(\%) \leq 125 \times \frac{0.85 \times 10^6 \times Vd(pl)^{-0.61}}{Rx(dpi)Ry(dpi)}$$

wherein Vd(pl) is an ejection volume per dot of the reaction liquid, Rx(dpi) is a recording resolution in the direction of the relative scanning, Ry(dpi) is a recording resolution in the arrangement direction of the nozzles, and duty(%) is a recording duty of the reaction liquid.

* * * * *

UNITED STATES PATENT AND TRADEMARK OFFICE
CERTIFICATE OF CORRECTION

PATENT NO.         : 7,226,157 B2
APPLICATION NO. : 10/765037
DATED                 : June 5, 2007
INVENTOR(S)      : Nakazawa et al.

It is certified that error appears in the above-identified patent and that said Letters Patent is hereby corrected as shown below:

COLUMN 2:
Line 22, "show through" should read --show-through--.
Line 38, "show through" should read --show-through--.
Line 67, "show through" should read --show-through--.

COLUMN 3:
Line 3, "show" should read --show- --.
Line 19, "show through" should read --show-through--.

COLUMN 10:
Line 55, "show through" should read --show-through--.

COLUMN 11:
Line 47, "show through" should read --show-through--.

COLUMN 12:
Line 52, "show through" should read --show-through--.

COLUMN 13:
Line 7, "show through" should read --show-through--.
Line 48, "show through" should read --show-through--.

COLUMN 20:
Line 44, "splash" should read --splash,--.

COLUMN 23:
Line 59, "show" should read --show- --.

UNITED STATES PATENT AND TRADEMARK OFFICE
CERTIFICATE OF CORRECTION

PATENT NO. : 7,226,157 B2
APPLICATION NO. : 10/765037
DATED : June 5, 2007
INVENTOR(S) : Nakazawa et al.

It is certified that error appears in the above-identified patent and that said Letters Patent is hereby corrected as shown below:

COLUMN 24:
Line 37, "Show Through:" should read --Show-Through:--.
Line 42, "show through." should read --show-through.--.

COLUMN 25:
Table 1, "Show through" (in column 9) should read --Show-through--.

Signed and Sealed this

Third Day of March, 2009

JOHN DOLL
*Acting Director of the United States Patent and Trademark Office*